United States Patent [19]
Ellis et al.

[11] Patent Number: 5,612,729
[45] Date of Patent: Mar. 18, 1997

[54] METHOD AND SYSTEM FOR PRODUCING A SIGNATURE CHARACTERIZING AN AUDIO BROADCAST SIGNAL

[75] Inventors: Michael D. Ellis; Stephen M. Dunn; Michael W. Fellinger; Fancy B. Younglove, all of Boulder; David M. James, Fort Collins; David L. Clifton, Boulder; Richard S. Land, Lafayette, all of Colo.

[73] Assignee: The Arbitron Company, Columbia, Md.

[21] Appl. No.: 475,779

[22] Filed: Jun. 7, 1995

Related U.S. Application Data

[62] Division of Ser. No. 876,578, Apr. 30, 1992, Pat. No. 5,436,653.

[51] Int. Cl.$^6$ .......................... H04N 17/00; H04N 17/04
[52] U.S. Cl. ..................... 348/2; 348/907; 455/2
[58] Field of Search .................... 348/2, 3, 907; 455/2, 67; H04N 17/00, 17/04, 17/06

[56] References Cited

U.S. PATENT DOCUMENTS

| | | | |
|---|---|---|---|
| 2,766,374 | 10/1956 | Hoffman | 358/84 |
| 3,919,479 | 11/1975 | Moon | 179/15 B |
| 4,025,851 | 5/1977 | Haselwood et al. | 325/31 |
| 4,230,990 | 10/1980 | Lert, Jr. et al. | 455/67 |
| 4,450,531 | 5/1984 | Kenyon et al. | 364/604 |
| 4,547,804 | 10/1985 | Greenberg | 358/142 |
| 4,599,644 | 7/1986 | Fischer | 358/84 |
| 4,639,799 | 1/1987 | Inoue | 360/85 |
| 4,677,466 | 6/1987 | Lert, Jr. et al. | 358/84 |
| 4,697,209 | 9/1987 | Kiewit et al. | 358/84 |
| 4,718,106 | 1/1988 | Weinblatt | 455/2 |
| 4,739,398 | 4/1988 | Thomas et al. | 358/84 |
| 4,750,034 | 6/1988 | Lem | 358/84 |
| 4,843,562 | 6/1989 | Kenyon et al. | 455/2 |
| 4,857,999 | 8/1989 | Welsh | 381/43 |
| 4,918,730 | 4/1990 | Schulze | 358/142 |
| 4,931,871 | 6/1990 | Kramer | 358/142 |
| 4,945,412 | 7/1990 | Kramer | 358/142 |
| 4,955,070 | 9/1990 | Welsh et al. | 358/84 |
| 4,967,273 | 10/1990 | Greenberg | 358/142 |
| 5,019,899 | 5/1991 | Boles et al. | 358/84 |
| 5,023,929 | 6/1991 | Call | 455/2 |

OTHER PUBLICATIONS

Gonzalez & Wintz, *Digital Image Processing*, 1987, title page, copyright page and pp. 122–130.

Primary Examiner—Glenton B. Burgess
Attorney, Agent, or Firm—Curtis, Morris & Safford P.C.; Eugene L. Flanagan, III

[57] ABSTRACT

A method and system for producing a signature which characterizes an audio broadcast signal for use in broadcast signal recognition, wherein the signature is based on a comparison of time-displaced frequency band values each representing a respective frequency band of the audio broadcast signal. Each of a first group of the frequency band values is compared with a respective value from the second group representing portions of the audio broadcast signal within the same predetermined frequency band. At least a part of the signal portions represented by the second group were broadcast prior to the signal portions represented by the first group, and a signature is formed based on the comparison of the first and second groups.

4 Claims, 19 Drawing Sheets

“5,612,729”

METHOD AND SYSTEM FOR PRODUCING A SIGNATURE CHARACTERIZING AN AUDIO BROADCAST SIGNAL

This application is a division of application Ser. No. 07/876,578, filed Apr. 30, 1992 now U.S. Pat. No. 5,436,653.

BACKGROUND OF THE INVENTION

The present invention relates to the automatic recognition of widely disseminated signals, such as television and radio broadcasts, and the like.

Broadcast advertisers need to confirm that their advertisements have been aired in their entireties by designated broadcast stations and at the scheduled times. Further, it may be desirable for advertisers to know what advertisements their competitors have aired. A conventional technique for monitoring the advertisements that have been aired involves employing a large number of people to watch designated broadcast channels over the course of the day in order to record this information in a written diary. It will be appreciated that this conventional technique involves the need to employ a large number of people as well as the need to gather their written records and to enter their contents in an automatic data processing system in order to produce reports of interest to particular advertisers. Such conventional technique has a relatively high recurring cost. In an attempt to reduce such costs, an automatic pattern recognition system has been developed as, for example, that disclosed in U.S. Pat. No. 4,739,398.

In the continuous pattern recognition technique disclosed in U.S. Pat. No. 4,739,398, a segment or portion of a signal may be identified by continuous pattern recognition on a real-time basis. The signal may be transmitted, for example, over-the-air, via satellite, cable, optical fiber, or any other means effecting wide-dissemination thereof.

For example, in the case of a television broadcast signal the video signal is parametized so as to produce a digital data stream having one 16-bit digital word for each video frame which, in the NTSC system, occurs every 1/30 of a second. It will be appreciated that different signal intervals, such as video fields, may instead be parametized in this fashion. These digital words are compared to digital words representing commercials or other segments of interest which are stored in a storage device. Information relating to each match that is detected therebetween (which indicates that a segment of interest has been broadcast) is collected.

More specifically, a digital key signature is generated for each known segment (e.g., commercial) which is to be recognized or matched. The key signature advantageously includes eight 16-bit words or match words which are derived from eight frames of broadcast information which are selected from among the frames contained within the desired segment in accordance with a predetermined set of rules, together with offset information indicating the spacing (measured, for example, in frames or fields) between the location of the frame represented by each word of the signature and that represented by the first word thereof. In the case of a video signal, thirty-two predetermined areas thereof comprising, for example, eight by two pixels from each frame (or one selected field thereof representing each frame) are selected, for example. An average luminance value for the pixels of each area is produced and compared with the average luminance value of an area paired therewith. The result of such comparison is normalized to a bit value of one or zero based on a determination whether the average luminance value of a first one of the areas is either (i) greater than or equal to, or (ii) less than, the average luminance value of the second one of the areas. In this fashion, a sixteen bit frame signature is produced for each frame of the video signal.

A sixteen bit mask word is also produced for each sixteen bit frame signature. Each bit of the mask word represents the susceptibility of a corresponding bit of the frame signature to noise, and is produced on the basis of the difference between the average luminance values of the respective areas used to produce the corresponding bit of the frame signature. That is, if the absolute value of the difference between such average luminances values is less than a guard band value, the corresponding mask bit is set, indicating susceptibility to noise.

The eight match words are selected from the above-described frame signatures of each segment and stored, together with their mask words and offset information, as part of the key signature for that segment.

The received signal to be recognized is digitized and a 16-bit frame signature is produced in the manner described above for each frame (or selected field) of data. After the incoming signals are received and processed, they are read into a buffer which holds a predetermined amount of data. Each 16-bit frame signature from the incoming signal is assumed to correspond with the first word of one of the previously stored eight-word key signatures. As such, each received word is compared to all key signatures beginning with that word. Using the offset information stored with the signatures, subsequent received frame signatures (which are already in the buffer) are compared to the corresponding match words in the key signature to determine whether or not a match exists.

More specifically, each match word of the key signature is paired with a respective frame signature of the received signature based on the offset information and corresponding bits of the paired match words and frame signatures are compared. A total error count is produced based on this comparison as follows. If corresponding bits of the match word and frame signature are unmasked, then an error count of zero is accumulated when these bits are the same in value and an error count of one is accumulated if these bits differ in value. If the bits are masked, then an error count of one-half is accumulated therefor regardless of the bit values. A total error count is accumulated for all match words and corresponding frame signatures and, if the total error count is less than a predetermined default or error threshold, a match is found. Otherwise, no match is found.

As will be appreciated, in order to perform the above exemplary processing in real time, all comparisons should be completed within the time associated with each data frame, that is, within 1/30 of a second. Typical processing speed, associated with normal processing devices, will allow only a limited number of segment signatures to be stored and used for comparison.

The speed with which a key signature can be compared to a segment signature for a newly received broadcast may be substantially increased by utilizing a keyword look-up data reduction method. In this method, one frame is selected from the frames contained within the segment corresponding to the key signature, in accordance with a set of predetermined criteria. Such selected frame is a key frame and the frame signature associated therewith is the keyword. The key signature still preferably has eight 16-bit words, however, the offset information relating thereto now represents spacing from the keyword, rather than a spacing from the first word in the key signature.

The keyword may be one of the key signature words within the key signature, in which situation the offset for that word has a value of 0, or it may be a ninth word. The frame location of the keyword does not need to temporally precede the frame locations of all of the other match words within the key signature.

There may be multiple key signatures associated with each keyword. As an example, if 16-bit words are utilized and if four key signatures are associated with each keyword, then four complete signature comparisons would be the maximum number that would have to be performed within the 1/30 of a second time limit (assuming no data errors). Such number of comparisons is readily performed within the time limit.

It is desired to achieve the highest possible accuracy in broadcast segment recognition, as well as the greatest possible efficiency. However, a number of problems are encountered in carrying out such a technique. For example, broadcast signals are subject to time shifts such as a shift in the edge of a video picture which occurs from time to time. Video signals are also subject to jitter. Each of these effects will adversely impact a segment recognition technique relying upon sampling predetermined portions of the video signal, unless these effects are somehow compensated.

A further difficulty encountered in carrying out broadcast segment recognition based upon video signals is that the signatures which they generate tend to be distributed unevenly in value due to the similarities between video signals of different segments. Accordingly, video signatures tend to be distributed unevenly so that relatively large numbers of signatures tend to have similar values and are, thus, prone to false match (that is, indicate a match between signatures representing different segments).

Heretofore, it has been thought impractical to carry out pattern recognition of audio broadcast segments due to the difficulties encountered in extracting sufficient information from audio signals. For example, television audio signals are predominantly speech signals which are concentrated below approximately 3,000 Hz and possess very similar frequency spectra from one segment to the next.

Due to the foregoing effects, as well as signal noise, it is difficult to implement a pattern recognition technique for broadcast segment identification which possesses high accuracy. That is, the possibilities that segment signatures either will false match or fail to provide a completely reliable match tends to limit the accuracy of such a technique. Where, for example, known segments are not identified by the pattern recognition system, they may be transmitted to a workstation operator for identification as potential new segments, when in fact they are not. The result is that workstation operator time is wasted and system efficiency is degraded. On the other hand, if new segments are identified when in fact they are not segments of interest, workstation operator time may also be wasted in a useless attempt to identify such segments. For example, in a television commercial recognition system, it is necessary to distinguish television commercials from normal programming, news breaks, public service announcements, etc. It is, therefore, desirable to ensure that the greatest number of new segments provided to workstation operators for identification are in fact segments of interest. A further difficulty is encountered where new segments of interest are incorrectly split, so that portions of new segments only are reported to the workstation operators which may prevent correct identification of the segment which also wastes the operator's time.

OBJECTS AND SUMMARY OF THE INVENTION

It is an object of the present invention to provide methods and apparatus for use in broadcast segment recognition and the like providing improved recognition accuracy and system efficiency.

In accordance with an aspect of the present invention, a broadcast segment recognition system and method comprise means for and the steps of, respectively, producing a signature for each of a plurality of broadcast segments to be recognized; storing each said signature to form a database of broadcast segment signatures; monitoring a broadcast segment; forming a signature representing the monitored broadcast segment; comparing the signature representing the monitored broadcast segment with at least one of the broadcast segment signatures of the database to determine whether a match exists therebetween; and evaluating the validity of a match of a monitored broadcast segment by carrying out at least one of: (a) determining whether the monitored broadcast segment is temporally bounded by predetermined signal events; (b) determining whether the monitored broadcast segment overlaps another monitored broadcast segment for which a match has been accepted in accordance with predetermined criteria; and (c) determining whether the match conforms with a predetermined profile of false matching segments.

In accordance with another aspect of the present invention, a system and method for broadcast segment recognition are provided comprising means for and the steps of, respectively, producing a signature for each of a plurality of broadcast segments to be recognized; storing each said signature to form a database of broadcast segment signatures; monitoring a broadcast segment; forming a signature representing the monitored broadcast segment; comparing the signature representing the monitored broadcast segment with each of a plurality of broadcast segment signatures of the database to determine whether a match exists therebetween in accordance with a first error tolerance level; evaluating whether the match falls within a class of questionably acceptable matches based upon predetermined evaluation criteria; and, if the match falls within said class of questionably acceptable matches, comparing the signature representing the monitored broadcast segment with the matching broadcast segment signature of the database utilizing a second error tolerance level accepting matches having relatively higher error levels than matches acceptable in accordance with the first error tolerance level.

In accordance with a further aspect of the present invention, a system and method of producing a signature characterizing an audio broadcast signal for use in broadcast signal recognition, comprise the means for and the steps of, respectively, forming a plurality of frequency band values each representing portions of said audio broadcast signal within respective predetermined frequency bands; comparing each of a first group of said plurality of frequency band values with a respective one of a second group of said plurality of frequency band values representing portions of said audio broadcast signal within the same respective predetermined frequency band, each respective one of the second group of said plurality of frequency band values representing portions of said audio broadcast signal at least a part of which were broadcast prior to the portions of said audio broadcast signal represented by the corresponding one of said first group of said plurality of frequency band values; and forming said signature based upon the comparisons of the first and second groups of said plurality of frequency band values.

In accordance with still another aspect of the present invention, a system and method are provided for producing a signature characterizing an interval of a video signal representing a picture for use in broadcast segment recognition, wherein the signature is produced based on portions of the video signal representing corresponding regions of the picture each spaced a respective predetermined amount from a nominal edge of the picture, comprising the means for and the steps of, respectively, detecting a shift in the video signal corresponding with a shift in the edge of the picture from the nominal edge thereof; adjusting the portions of the video signal to compensate for said shift in the edge of the picture; and producing the signature based on the adjusted portions of the video signal.

In accordance with a still further aspect of the present invention, a system and method are provided for producing signatures characterizing respective intervals of a broadcast signal exhibiting correlation between at least some of said respective intervals for use in broadcast segment recognition, comprising the means for and the steps of, respectively, producing a difference vector for each respective interval of said broadcast signal having a plurality of elements each representing differences between respective predetermined portions of said each respective interval and exhibiting correlation therebetween; carrying out a vector transformation of said difference vector of each respective interval to produce a transformed difference vector having a plurality of elements for each respective interval of said broadcast signal such that correlation between the plurality of elements thereof is less than the correlation between the plurality of elements of said difference vector; and producing a signature for each respective interval of said broadcast signal based on the corresponding transformed difference vector.

In accordance with yet still another aspect of the present invention, a system and method are provided for producing a signature characterizing an interval of a video signal representing a picture for use in broadcast segment recognition, wherein the signature is produced based on portions of the video signal representing corresponding regions of the picture, and for producing a corresponding mask word including a plurality of bit values each representing a reliability of a corresponding value of the signature, comprising the means for and the steps of, respectively, forming a first signature having a plurality of values each based on respective ones of said portions of the video signal; forming a second signature having a plurality of values each based on respective ones of a plurality of shifted portions of the video signal each corresponding to a respective one of said portions and having a location displaced from a location of said respective one of said portions by a predetermined amount, such that each value of said first signature corresponds to a value of the second signature; comparing respective values of said first and second signatures; establishing said bit values of said mask word based on the comparison of a respective value of said first signature with the corresponding value of the second signature.

In accordance with another aspect of the present invention, a system and method are provided for updating a broadcast segment recognition database storing signatures for use in recognizing broadcast segments of interest, comprising the means for and the steps of, respectively, monitoring a broadcast signal to detect predetermined signal events indicating possible broadcast segments of interest corresponding with respective monitored broadcast signal intervals; determining whether at least two alternative possible broadcast segments of interest are detected for a monitored broadcast signal interval; assigning priority to one of said at least two alternative possible broadcast segments of interest based upon predetermined criteria; and storing a signature in the database corresponding with the one of said at least two alternative possible broadcast segments of interest assigned priority.

In accordance with a further aspect of the present invention, a system and method are provided for updating a broadcast segment recognition database storing signatures for use in recognizing broadcast segments of interest, comprising the means for and the steps of, respectively, monitoring a broadcast signal to detect predetermined signal events indicating possible broadcast segments of interest corresponding with respective monitored broadcast signal intervals; determining the extent to which the respective monitored broadcast signal intervals deviate from predetermined broadcast signal intervals of possible broadcast segments of interest; selecting ones of said respective monitored broadcast signal intervals as new segments of interest based upon the determined extent of deviation thereof from said standard lengths of broadcast segments of interest; and storing a signature in the database corresponding with the selected ones of the respective monitored broadcast signal intervals.

In accordance with still another aspect of the present invention, a system and method are provided for selectively capturing at least one of a broadcast audio signal and a broadcast video signal for use in updating a broadcast segment recognition database storing signatures for use in recognizing broadcast segments of interest, comprising the means for and the steps of, respectively, temporarily storing at least one of a broadcast audio signal and a broadcast video signal of a monitored broadcast; detecting predetermined signal events indicating possible new broadcast segments of interest of the monitored broadcast; selecting intervals of the monitored broadcast as possible new broadcast segments of interest based upon said predetermined signal events; assigning a first capture level to a first selected interval based on predetermined characteristics thereof indicating that said first selected interval is likely to be a new segment of interest; assigning a second capture level to a second selected interval based on predetermined characteristics thereof indicating that the second selected interval is relatively less likely than the first selected interval to be a new segment of interest; storing a signature corresponding with the first selected interval in the database and capturing at least one of the temporarily stored broadcast audio and video signals corresponding with the first selected interval for transmission to a workstation operator for segment identification; storing a signature corresponding with the second selected interval in the database; and erasing the temporarily stored one of the broadcast audio and video signals corresponding with the second selected interval.

In accordance with a still further aspect of the present invention, a system and method are provided for producing a signature characterizing a broadcast signal interval for use in broadcast segment recognition having a signature database, the signature including a plurality of digital words each characterizing a respective sub-interval of said broadcast signal interval, comprising the means for and the steps of, respectively, dividing the broadcast signal interval into a plurality of sub-intervals; forming a plurality of digital words characterizing each of said plurality of sub-intervals; and selecting at least one of the plurality of digital words characterizing each sub-interval based on at least one of the following factors: (a) a distribution of previously generated digital words characterizing broadcast signals; (b) a distribution of digital words of previously generated signatures stored in the signature database; (c) a probability that the at least one of the plurality of digital words will match a digital word characterizing a corresponding sub-interval upon rebroadcast of the sub-interval; and (d) a degree of signal difference between the sub-interval corresponding with the at least one of the plurality of digital words and adjacent portions of the broadcast signal interval.

In accordance with yet another aspect of the present invention, a system and method are provided for broadcast segment recognition, comprising the means for and the steps of, respectively, producing a signature for each of a plurality of broadcast segments to be recognized; for each produced signature, determining a probability that such produced signature will match with a signature produced upon rebroadcast of the corresponding broadcast segment and producing a corresponding probability based criterion for use in evaluating a match of the produced signature; storing each produced signature and its corresponding probability based criterion to form a database; monitoring a broadcast segment; forming a signature representing the monitored broadcast segment; comparing the signature representing the monitored broadcast segment with at least one signature stored in the data base to determine a match thereof; and determining whether to accept said match based on the corresponding probability based criterion.

In accordance with a yet still further aspect of the present invention, a system and method are provided for broadcast segment recognition, comprising the means for and the steps of, respectively, producing a digital signature for each of a plurality of broadcast segments to be recognized, each said digital signature including a plurality of bit values characterizing a corresponding one of said plurality of broadcast segments; for each produced digital signature, determining a probable number of bit values thereof that will match with the bit values of a digital signature produced upon rebroadcast of the corresponding broadcast segment and producing a corresponding probability based match value for use in determining whether said each produced digital signature matches a digital signature of a subsequently received broadcast segment; storing each produced signature and its corresponding probability based match value to form a database; monitoring a broadcast segment; forming a digital signature having a plurality of bit values representing the monitored broadcast segment; comparing the digital signature representing the monitored broadcast segment with at least one digital signature stored in the database; and determining whether the digital signature representing the monitored broadcast segment matches the at least one digital signature utilizing the corresponding probability based match value.

In accordance with yet still another aspect of the present invention, a system and method are provided for broadcast segment recognition, comprising the means for and the steps of, respectively, producing a signature for each of plurality of broadcast segments to be recognized; for each produced signature, determining a probability that such produced signature will match with a signature produced upon rebroadcast of the corresponding broadcast segment; producing a further signature for said each of a plurality of broadcast segments to be recognized when said probability that said produced signature will match with a signature produced upon rebroadcast of the corresponding broadcast segment is less than a predetermined value; storing each produced signature to form a database; monitoring a broadcast segment; forming a signature representing the monitored broadcast segment; and comparing the signature representing the monitored broadcast segment with at least one signature stored in the database.

Other objects, features and advantages of the present invention will become apparent from the following detailed description of the illustrative embodiments when read in conjunction with the accompanying drawings in which corresponding components are identified by the same reference numerals.

DETAILED DESCRIPTION OF THE PREFERRED EMBODIMENTS

Figure 1:
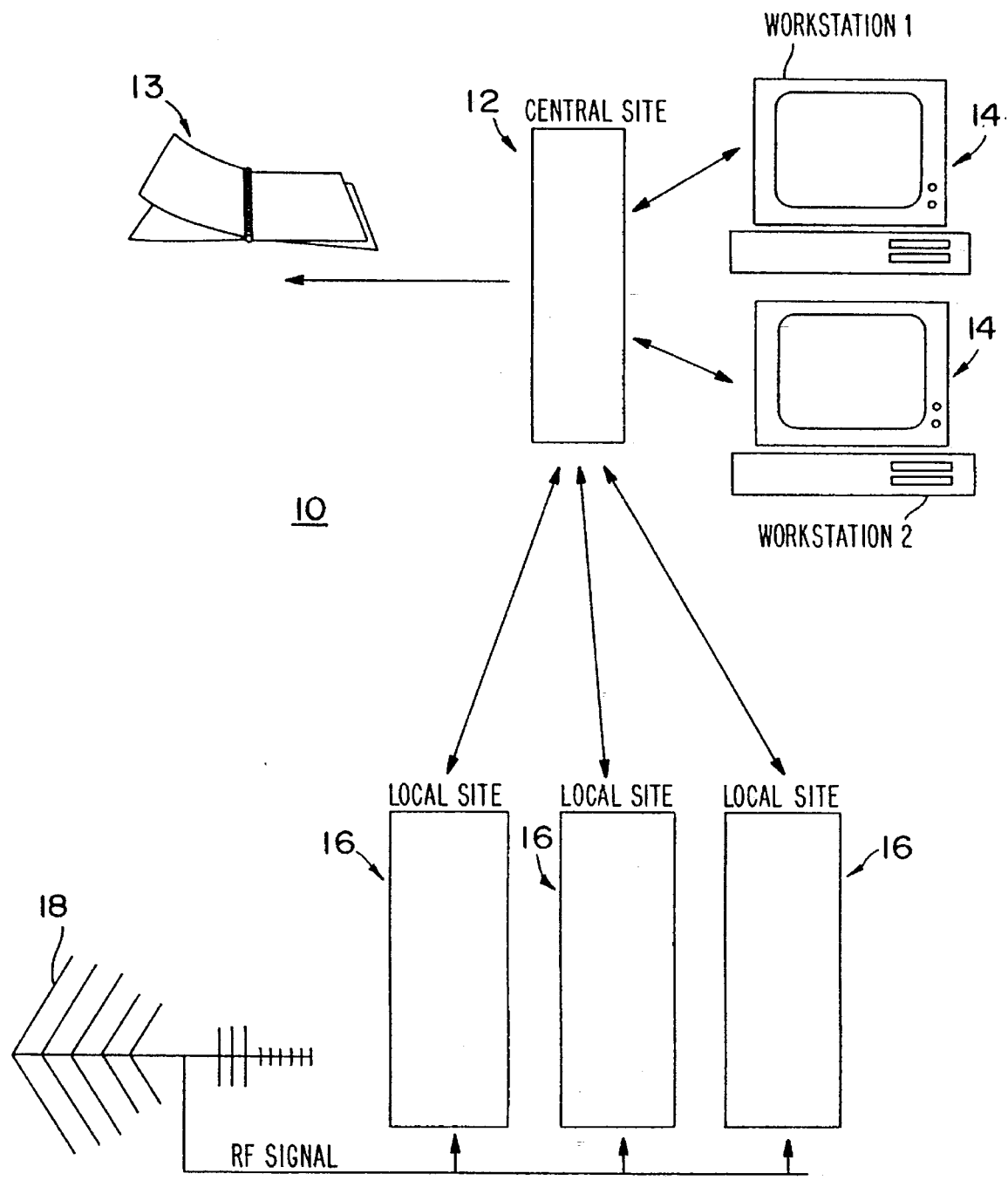
FIG. 1 illustrates a system for monitoring a continuous stream of broadcast signals.

FIG. 1 illustrates a system 10 for monitoring a continuous stream of television broadcast signals and providing recognition information to which the embodiments of the present invention may be applied. As shown therein, system 10 generally comprises a central site 12, one or more workstations 14 located at the central site 12, and one or more local sites 16. Each of the local sites 16 monitors broadcasting in a corresponding geographic region.

The central site 12 communicates with each of the local sites 16, for example, via telephone lines, to receive data regarding detection of known broadcast segments and potentially new, unknown segments, and to provide segment signature and detection information corresponding to new broadcast segments. The central site 12 compiles the received data and formulates the same into a report 13 which, for example, may be supplied to broadcast advertisers.

The central site 12 also supplies broadcast data, for example, audio and video data, to the workstations 14 where new and unknown segments are identified by human operators and assigned an identification code. If a site identifies a portion of a broadcast as a new segment of interest (such as a commercial), when it is in fact something else (such as normal programming), workstation operator time to identify the unwanted segment is wasted. Also, if an already known segment cannot be correctly identified by the system 10, it may be reported incorrectly by the central site 12 to a workstation 14 as a new segment, thus further wasting operator time. The cost to employ operators is a significant ongoing expense. Accordingly, it is desirable to minimize this expense by accurately detecting new segments of interest and identifying known segments. The present invention provides improved methods and apparatus for signal recognition which achieve an enhanced ability to accurately identify known segments of interest as well as minimization of the need to identify potentially new segments with the assistance of workstation operators. In accordance with the disclosed embodiments of the invention such improved methods and apparatus are implemented at the local sites 16 of the system 10.

Each local site 16 is adapted to receive an RF broadcast signal from, for example, an antenna 18 or a cable television head end station (not shown for purposed of simplicity and clarity) and is capable of recognizing and identifying known broadcast segments by date, time, duration, channel, and other desirable information. The local sites 16 are also capable of recognizing the occurrence of potentially new, unknown segments, and of generating temporary key signatures therefor so that it can maintain a record of such occurrences pending identification of the segment by a workstation operator at the central site. Although the system 10 only illustrates three local sites 16, the system is not so limited and any number of local sites may be utilized. Similarly, the system 10 is not limited to only two workstations 14 as shown in FIG. 1.

Figure 2:
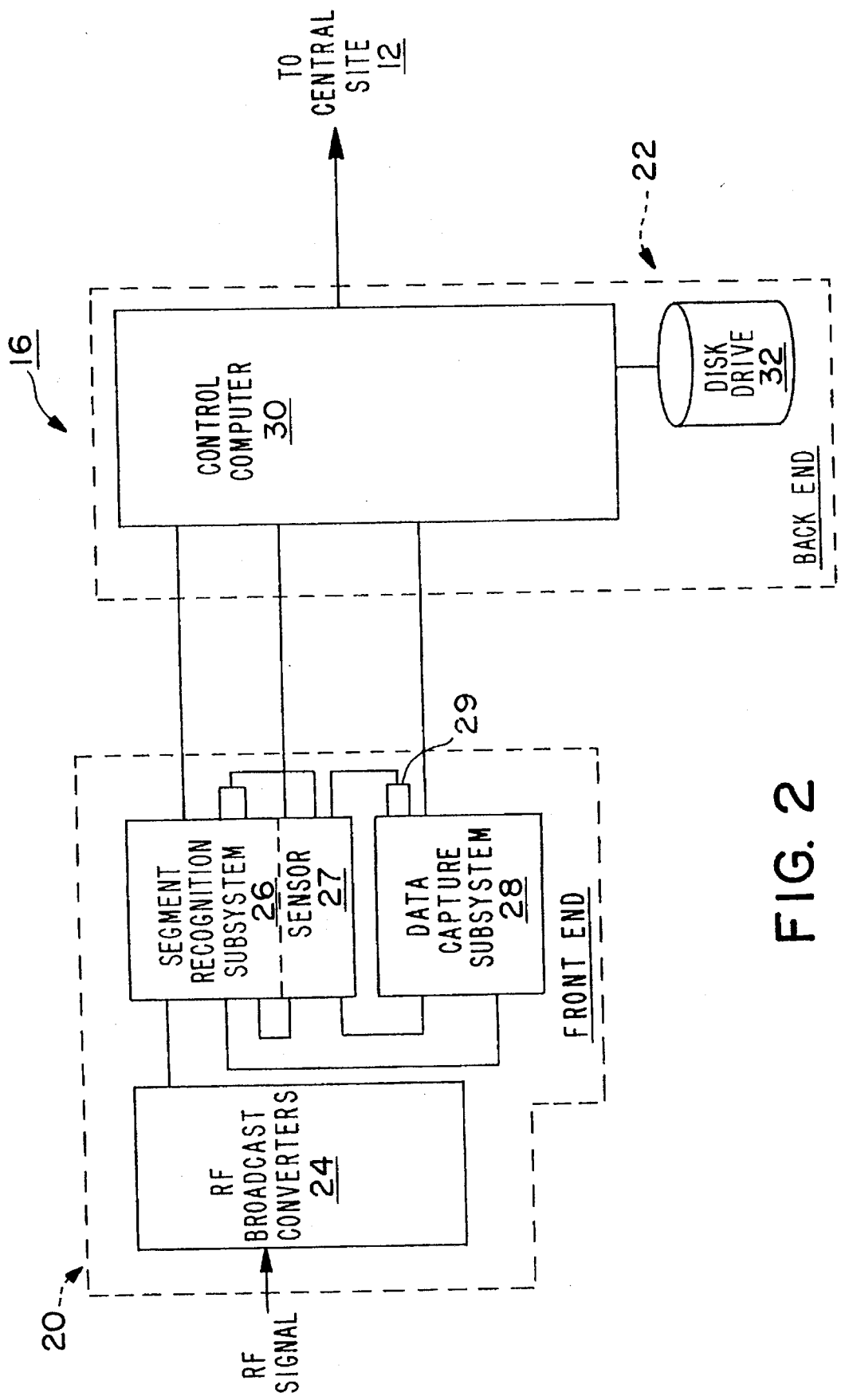
FIG. 2 is a diagram of one of the local sites in the system shown in FIG. 1.

FIG. 2 illustrates one of the local sites 16 in block form. As shown therein, each local site 16 generally comprises a front end portion 20 and a back end portion 22. The front end portion 20 includes one or more RF broadcast converters 24, a segment recognition subsystem 26, a sensor 27 and a data capture subsystem 28. The back end portion 22 includes a control computer 30 and at least one disk drive 32.

Each of the RF broadcast converters 24 receives television broadcast signals over a respective channel and demodulates the received signals to provide baseband video and audio signals. The video and audio signals are thereafter supplied to the segment recognition subsystem 26, wherein frame signatures for each of the video and audio signals are generated which are thereafter compared to stored key signatures to determine if a match exists. For purposes of clarity, video and audio signatures are separately termed "subsignatures" herein. The segment recognition subsystem also produces cues which represent signal events, such as a video fade-to-black or an audio mute. The cues as well as match information are supplied to the control computer 30 for use in determining whether the received signal represents a new segment or commercial of interest, determining whether to capture video and audio information for use at the central site in identifying a new segment of interest, assessing the validity of questionable matches, and for grouping match information for storage in a database.

The sensor 27 is adapted to monitor the operating temperature of the front end 20 and, in the event that the operating temperature exceeds a predetermined maximum operating temperature, to supply a signal so indicating to control computer 30. More specifically, sensor 27 receives temperature information relating to the subsystems 26 and 28 from one or more thermocouples 29 and processes such received temperature information for supply to the computer 30, so that if excessive temperatures are encountered, the subsystems 26 and 28 are turned off.

The data capture subsystem 28 receives the broadcast audio and video signals from the converters 24 by way of the segment recognition subsystem 26 and compresses and digitizes the same. These digitized signals are stored in a buffer contained within the subsystem 28 for a predetermined time period, and upon request are supplied to the control computer 30.

The control computer 30 is adapted to select key signatures, provide match confirmation, process new segment data and communicate with the central site 12. The disk drive 32 provides mass data storage capability for match occurrence information, new commercial information and audio/video data for transmission to the central site 12.

Figure 3:
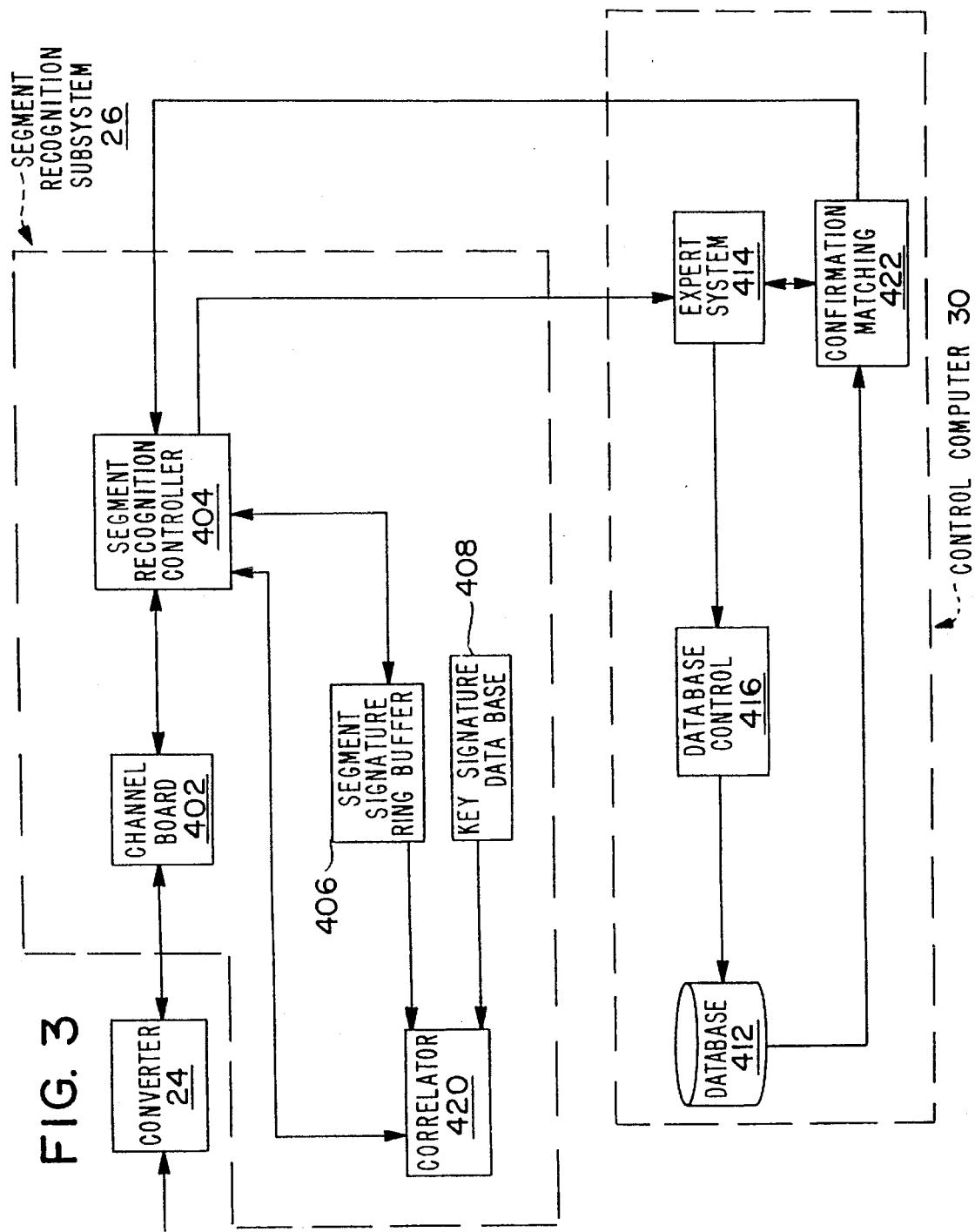
FIG. 3 is a diagram illustrating signal flows in the local site of FIG. 2 during a matching operation.

FIG. 3 illustrates the data flow for a typical matching operation. As shown therein, one of the converters 24 receives a desired channel of broadcast signals which are supplied as baseband video and audio signals to the segment recognition subsystem 26. The subsystem 26 includes a plurality of channel boards 402, one for each channel monitored by the local site 16, which each serves to generate a corresponding frame subsignature and mask word for each frame of the baseband video signal. In addition, each channel board generates a frame subsignature and mask word for each interval of the audio signal corresponding with a frame of the video signal and having the same format as the video subsignatures and mask words. It is appreciated that the use of corresponding intervals and data formats for the video and audio subsignatures advantageously facilitates processing thereof. It is also appreciated that subsignatures may be produced from different intervals, such as video fields or combinations of fields or frames or otherwise, and that the video and audio subsignatures and mask words need not follow the same format. The channel boards 402 also serve to detect video signal fades-to-black based on the receipt of at least one substantially black field or frame of the received baseband video signal, as well as audio mutes, a reduction of the baseband audio signal level representing silence. The channel boards 402 also serve to detect video scene changes indicated by a rapid change in the video signal. These signaling events, as well as the video and audio subsignatures and mask words, produced by the channel board 402 are received by the segment recognition controller 404. Each local site 16 is provided with at least one auxiliary converter 24 and channel board 402, so that if one of the converters 24 and channel boards 402 should fail to operate, the segment recognition controller 404 generates a command to an auxiliary channel board and converter which then assume the functions of the inoperative equipment.

The segment recognition controller 404 communicates with a segment signature ring buffer 406 to store newly received segment signatures, that is, sequentially arranged frame signatures and mask words for each channel, for a predetermined time interval preceding the current time. The segment recognition controller also communicates with a correlator 420 to supply match commands thereto. The correlator 420 is also supplied with the appropriate segment signatures from the segment signature ring buffer 406 and key signatures from a key signature database 408. The correlator 420 performs the requested matching operation and supplies the match results, along with the relevant information (e.g., the corresponding error count), to the segment recognition controller 404. The segment recognition controller 404 supplies a match report for each audio and video sub-signature and signalling events to an expert system module 414 implemented by the control computer 30.

The expert system 414 evaluates each received match report to decide whether it is erroneous. In certain situations, the expert system 414 utilizes a confirmation matching process in the match report evaluation. In that event, the expert system supplies a confirmation match request to a confirmation matching module 422 also implemented by computer 30 which, in response thereto, supplies a signal to the segment recognition controller 404 requesting the appropriate segment signature. In response to such a request, the segment recognition controller supplies the appropriate segment signature to the confirmation matching module 422. In addition, the confirmation matching module receives the appropriate key signature from a database 412 maintained by a database control module 416 of the computer 30 under the control of the expert system 414. Upon completing the confirmation matching process, the confirmation matching module 422 supplies a confirmation match signal to the expert system 414. In response thereto, the expert system 414 supplies matching information, for example, occurrence data, through the database control module 416 to the database 412.

In certain situations, the expert system 414 may supply occurrence data prior to receiving the confirmation match response. If, in these situations, the confirmation matching module 422 determines that an acceptable match does not exist, the expert system 414 supplies a match rescind signal through the database control 416 to the database 412 whereupon the previously supplied occurrence is rescinded.

VIDEO SIGNATURE GENERATION

Figure 4:
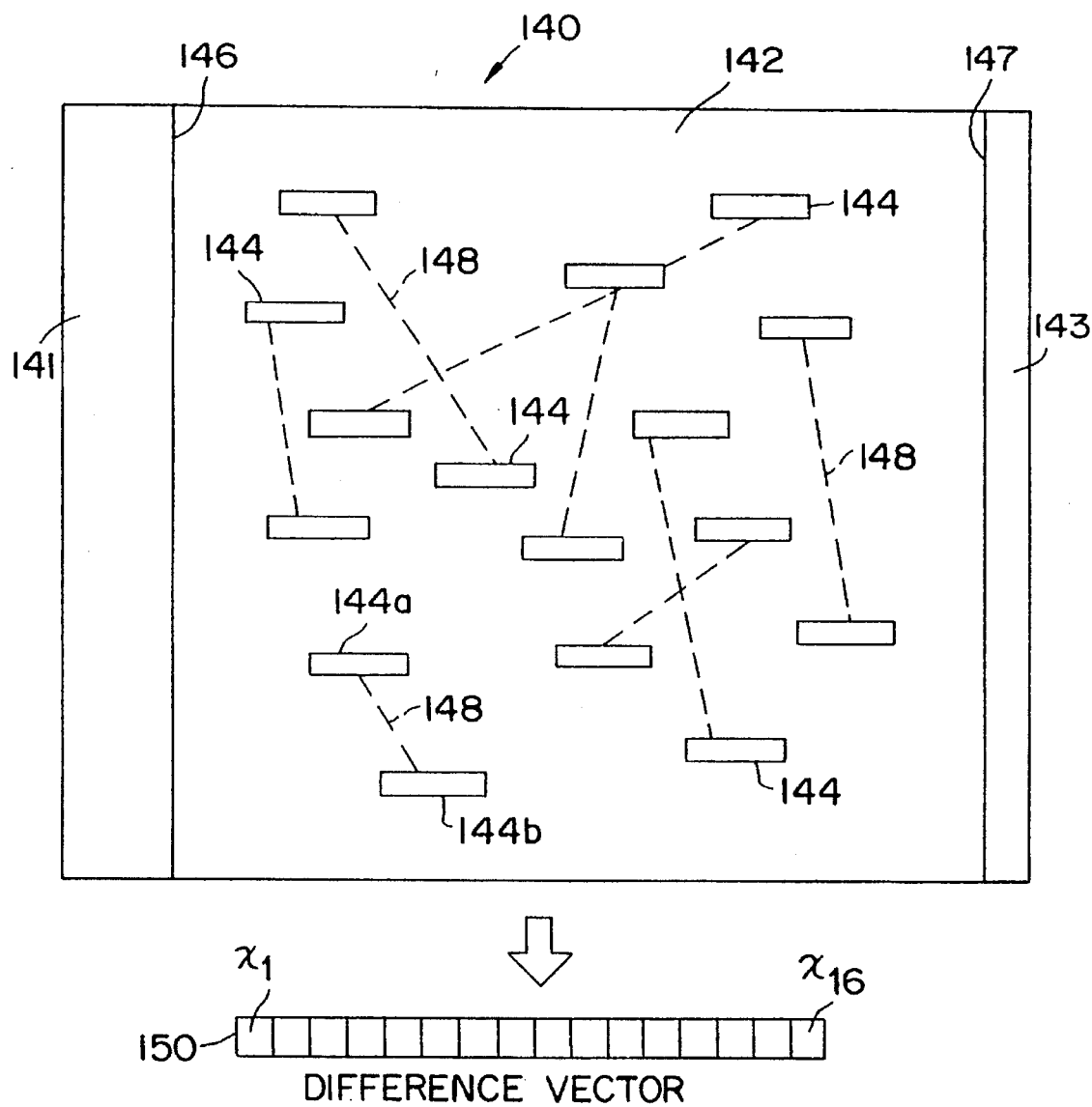
FIG. 4 is a diagram used to explain a method for forming a video frame signature.

Each of the channel boards 402 produces video frame signatures by first producing a difference vector 150 in the form of an ordered sequence of elements $x_1, x_2, \ldots x_{16}$ for each video frame in accordance with the technique illustrated in FIG. 4. As shown in FIG. 4, a frame 140 of a video signal includes a back porch region 141, a picture region 142 and a front porch region 143. The left edge 146 of the picture region 142 is bounded by the right edge of the back porch region 141, whereas the right edge 147 of the picture region 142 is bounded by the left edge of the front porch region 143.

Thirty-two predetermined superpixel areas 144 are defined for each frame, of which sixteen exemplary superpixel areas are illustrated in FIG. 4. Each superpixel area 144 is rectangular and includes, for example, between 18 and 21 pixels in each of 4 vertically adjacent horizontal lines from the picture area 142. A portion 144 is selected, as described in greater detail hereinafter, and an average luminance value thereof is produced. Each superpixel area 144 is paired with a respective other area 144 as indicated by the dash lines 148 in FIG. 4 for comparing the respective average luminance values thereof. Each such pair of respective average luminance values is used to produce the value of a corresponding element $x_n$ of the difference vector 150. For example, the average luminance value of the selected portion of superpixel area 144a is subtracted from that of paired superpixel area 144b to produce the value of a corresponding element $x_n$ of the difference vector 150.

Thereafter, each difference vector 150 is subjected to a sequence of vector transformations described hereinbelow which yield a corresponding sixteen-element transformed or resultant vector. Then a sixteen-bit frame signature is produced wherein each bit is either set or reset depending on the sign of a corresponding element of the resultant vector. In addition, the value of each element of the resultant vector is examined to determine whether (1) its absolute value is less than a guard band value, or (2) it is susceptible to jitter (as explained below). If either condition (1) or (2) obtains, then the corresponding mask bit of a respective 16-bit mask word is set.

Video Edge Detection

With reference again to FIG. 4, it will be appreciated that the positions of the superpixel areas 144 must be accurately determined with respect to an edge of the picture region 142 so that pixels of each portion used for producing the respective average luminance values correspond from frame to frame. The video signals of television commercials are often received with a horizontal shift from a normal or standard position. The horizontal shift most often encountered is a shift to the right as determined by viewing a television receiver which would result in a shift to the right of the edge 146 of picture area 142 in FIG. 4. While horizontal shifts to the left may occur, such shifts occur significantly less often than shifts to the right. Although most horizontal shifts or offsets are typically not large enough to be detectable by a viewer, these shifts may affect the generation of frame signatures by shifting the edge of each video frame's picture area 142 thereby shifting the portions of the superpixels used in signature generation. If not compensated, this effect will degrade the ability of the system 10 to reliably produce frame signatures and, thus, adversely affect system accuracy overall.

A video edge detection module, implemented by each of the channel boards 402 of FIG. 3, is provided for detecting a shift in the edge of the picture region 142 of a received video signal. Since, as previously mentioned, horizontal shifts to the right have been observed to occur more frequently, in describing the video edge detection module, it will be assumed that a horizontal shift to the right has occurred. However, the present invention is not so limited and may be utilized for horizontal shifts to the left.

Figure 5A:
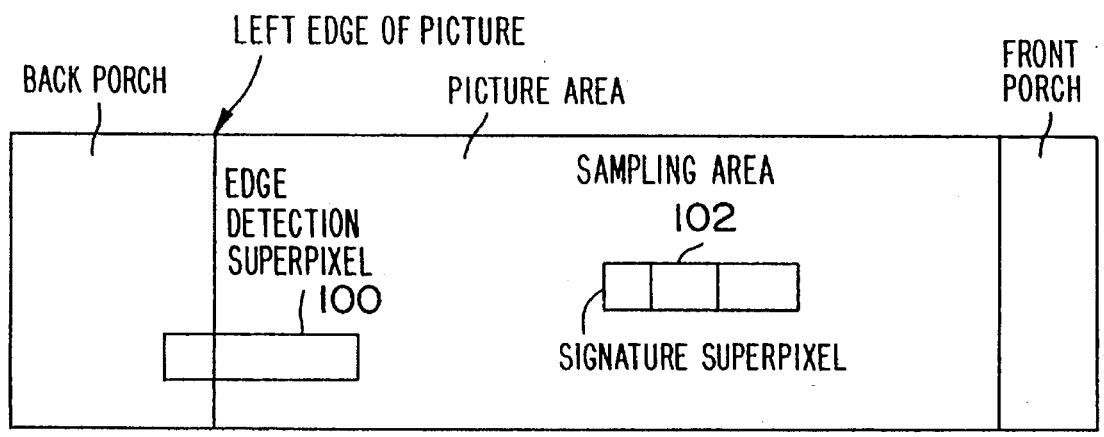
FIGS. 5A and 5B illustrate a portion of a video frame having a normal edge condition and a shifted edge condition, respectively.
Figure 5B:
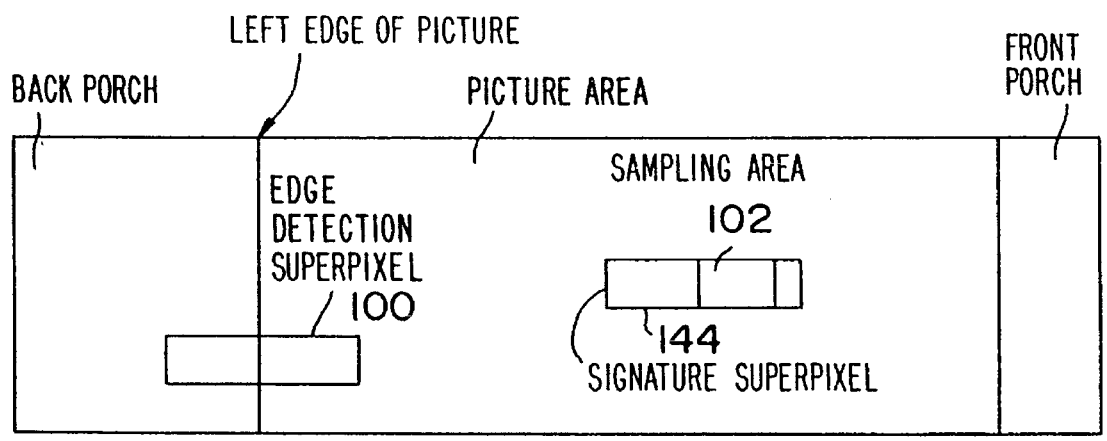

FIG. 5A illustrates a video frame having a standard or normal edge location. As shown therein, the video frame includes a back porch portion, a picture area and a front porch portion. FIG. 5B illustrates a video frame having a horizontal shift to the right, in which such a shift increases the size of the back porch portion and decreases the picture area by a corresponding amount.

The video edge detection module places at least one edge detection superpixel 100, which is a rectangular sampling area, across the boundary between the picture area and the back porch area, as shown in FIGS. 5A and 5B so that the superpixel 100 includes the normal edge location as well as adjacent picture regions to which the edge may be shifted. The video data from within such edge detection superpixels 100 are processed to determine the position of the left edge of the picture area. Each edge detection superpixel 100 advantageously has the same area as that of each superpixel area 104, which preferably has a size of approximately 18 to 21 pixels in length by 4 pixels in height. As such, each edge detection superpixel 100 contains portions from more than one video line. Each of these video lines within the superpixel 100 provides data on the left picture edge position. In an advantageous embodiment, the left edge positions obtained from each line in all of the edge detection superpixel areas 100 are combined to produce an estimated location for the left edge of the picture area. By so combining all of the left edge position data, a more reliable estimate of the left edge is obtained as compared to that derived from using just a single line of edge position information which may be adversely influenced by noise in the video signal.

Thus, the left edge of the picture is obtained by combining the left edge values obtained for each of the video data lines in all of the edge detection superpixel areas 100. In so determining the left edge of the picture, it is preferable to discard extreme values obtained from the video data lines and average the remaining values. In a preferred embodiment, the two lowest values as well as the highest value for the left edge of the picture are considered extremes and, as such, are discarded. Since signal noise is more apt to result in a low value, more low values for the left edge are discarded.

As previously mentioned, there are 32 superpixel areas 144 associated with each frame of the video signal. Within each of these superpixel areas 144 is a sampling area 102. This sampling area 102 is the area from which the video data are extracted for use in generating the respective frame signature. For example, FIG. 5A illustrates the location of the sampling area 102 within the superpixel area 144 for a frame having a standard edge condition. When the superpixel areas 144 measure between 18 and 21 pixels by four lines, the sampling areas are selected advantageously to measure 4 pixels by 4 lines. When a horizontal shift in the left edge of the picture is detected as previously discussed, the effects of such a shift upon the sampling area 102 may be compensated by changing the sampling area 102 in accordance with the detected horizontal shift as shown in FIG. 5B. That is, if the left edge of the picture is determined to have shifted to the right by N pixels from the normal position, then the sampling area 102 is also shifted to the right by N pixels.

In a preferred embodiment, the video edge detection module preferably uses a predetermined minimum number of video data lines (e.g., approximately 6–8) from the edge detection superpixel areas 100 to locate the left edge of the picture area. However, when the portion of the picture area adjacent to the back porch is relatively dark, it may be difficult to accurately locate the left edge of the picture area from any of the lines of video data contained within all of the edge detection superpixel areas 100. In this situation, a predetermined default value is used for the left edge of the picture area.

If the horizontal offset extends beyond the edge detection superpixel areas 100 such that the left edge of the picture lies outside the areas 100, then the video edge detection module considers the left edge not to have been found. In this situation, the above mentioned predetermined default value is used. Furthermore, in some instances, a horizontal offset may be detected which is larger than can be compensated for, that is, the sampling area 102 cannot be shifted an amount corresponding to the horizontal offset. In this situation, the sampling area 102 is shifted the maximum amount possible.

To determine the left edge of the picture area for each video line, the video edge detection module scans the pixel samples from left to right searching for a jump or increase in the luminance value of more than a predetermined amount between a respective pixel and the pixel which is located two pixels to the right of the respective pixel. If such a jump is detected, the difference in luminance values between the pixel currently being tested and the pixel three pixels to the right is then determined to ensure that the increase in luminance value is again equal to the predetermined value to filter out noise spikes. Further, by examining pixels which are located two pixels to the right of the pixel being tested, instead of testing adjacent pixels, an edge may be detected which otherwise would be undetectable when adjacent pixels are tested. That is, in relatively dark video scenes, the slope (difference) of the edge picture values is less than in relatively bright scenes.

The video edge detection module may place the left edge of the picture one or two pixels before the edge actually occurs. This does not present a problem as the video edge detection module corrects for differences between left edge positions for different broadcasts and need not detect an absolute edge position.

Thus, the video edge detection module enhances system accuracy by enabling reliable video frame signatures to be obtained from the received video signal. Further, the video edge detection module compensates for the horizontal offsets without requiring any additional hardware at the local site 16.

Video Preprocessing

It has been observed that certain values of video frame signatures occur more often than other values of video frame signatures so that video frame signatures tend to become concentrated together at certain values (sometimes referred to as "clumping" herein). Such clumping of video frame signatures may present several problems. First, a frequently occurring video frame signature, termed a "clump signature" is likely to be selected as a keyword. As a result, this keyword or clump signature may have a large number of key signatures associated with it. Since the correlator 420 of the segment recognition system 26 searches all key signatures corresponding to a respective keyword, clumping signatures can greatly increase the processing time of the correlator. As a result, this may limit the amount of data which may be stored within the database of the local site 16 and/or the number of broadcast channels which may be processed. Secondly, clumping may cause an increase in false matching. That is, as the number of signatures which are associated with a clump signature keyword increases, the closer the bit patterns of these signatures may come to one another. As a result, if a slight change in a segment signature occurs, for example, due to signal noise or jitter, the correlator 420 may inaccurately report a match.

Clumping can be considered to cause a reduction in the actual amount of information in a signature. For example, in the situation wherein all of the video frame signatures are the same, the value of each signature is known in advance. Therefore, in this situation, the value of the next video frame signature may be described by zero bits. At the other extreme, that is, when the video frame signatures are completely random so as to have a uniform distribution of values, all of the bits within the signature are needed to identify the respective signature.

Such clumping may be reduced or minimized by increasing the uniformity of the video frame signature distribution. For example, if the video frame signatures were uniformly distributed, each signature would occur with equal frequency. Each of the channel boards 402 of the segment recognition subsystem 26 (FIG. 15) preprocesses the input video signal to produce video frame signatures which are more uniformly distributed. That is, channel board 402 transforms the input video signal by utilizing a vector transform which, in turn, utilizes statistical data pertaining to relevant clumping information to reduce or minimize clumping of video frame signatures by reducing the correlation between the bits of each frame, which results in a more uniform distribution of signatures. The vector transform processing performed by the channel boards 402 will now be described in more detail.

In an advantageous embodiment of the invention, a Hotelling transform is employed to carry out a vector transformation of the difference vector 150 FIG. 4 which is designated x hereinbelow and includes sixteen ordered elements ($x_1, x_2 \ldots x_{16}$), which results in a reduction of the covariance between the elements $x_1, x_2 \ldots x_{16}$ of x. The Hotelling transform may be expressed as follows:

$$y = A(x-m)$$

in which x represents the difference vector 150, m is a vector which represents the mean values of the elements of x, A represents a transformation matrix and y is a vector which represents the transformed vector x. Once the transformed vector y has been produced, a frame signature is obtained therefrom by converting the sign of each element of the vector y into a respective bit value of the frame signature. That is, positive elements of the vector y are assigned one binary value, while negative elements thereof are assigned the other binary value.

Each element in the transformed vector y may be expressed as follows:

$$y(i) = \Sigma[A(i,j)*(x(j)-m(j))], j=0 \text{ to } 15$$

The covariance of y may be expressed as follows:

$$\begin{aligned} {[C_y]} &= yy' \\ &= [A(x-m)][A(x-m)]' \\ &= A(x-m)(x-m)'A' \\ &= A(C_x)A' \end{aligned}$$

in which (') represents the transpose of the respective vector. If the rows in the matrix A are selected as the normalized eigenvectors of the matrix $C_x$ (the covariance of x), the $C_y$ matrix is diagonal. As a result of such selection, the bits of the newly formed frame signature (FIG. 10), which are derived from y, are uncorrelated. However, although the bits contained within the frame signature are uncorrelated, they may not be statistically independent. Nevertheless, their interdependence with one another is reduced.

In a preferred embodiment of the present invention, the transformation matrix A is assumed to be a constant. This assumption implies that the incoming video signal is a wide-sense stationary process so that the values for $C_x$ and m are constant.

To determine the value of the transformation matrix A, the values for the vectors m and $[C_x]$ are utilized. These values may be obtained as follows:

$$m = (1/N)\Sigma(x), j = 1 \text{ to } N \quad (4)$$

and $$[C_x] = \left[ (1/N) \sum_{j=1}^{j=N} (xx') \right] - mm' \quad (5)$$

in which N represents the number of samples of x which are employed to determine the values of m and $[C_x]$. Upon determining the value of $[C_x]$, the transformation matrix A may be obtained by determining the eigenvectors of $[C_x]$.

To minimize susceptibility to frame jitter, the frame signature is calculated a predetermined number of times and the obtained signatures compared for differences therebetween. That is, in a preferred embodiment, the frame signature is determined as if horizontal shifts in the associated video frame of −1, 0 and +1 pixels have occurred. If a bit or bits in these three signature words vary from one to another, then the corresponding mask bit or bits are set. Further, if a transformed difference value is relatively close to zero, the mask bit corresponding thereto is set.

If the Hotelling transformation process is applied to a video signal as described above, relatively large clump signatures may not be broken up as finely as desired. That is, since the covariance used in this process is based on video data from all of the input video frames, whereas the frames having clumped signatures account for only a relatively small percentage of all of the frames, the effective contribution of the frames having clumped signatures to the covariance may be small. One approach to more effectively breakup these relatively large concentrations of frame signatures is to utilize separate transformations for groups of frames having similar signature values and occurring with greater than average frequency which are referred to hereinafter as "clumps". Such a transformation will also effectively breakup clumps associated with signatures having values which are bit-opposites of those associated with the original clump.

Using a single transformation process increases the uniformity of the frame signature distribution and, as a result, the number of video frames associated with respective frame signature values are closer to the average number of frame signatures obtained by utilizing the transformation process and have a higher acceptable match rate associated therewith as compared to signatures obtained without transformation.

On the other hand, the use of different transformations for different signature values or ranges of signature values can increase the uniformity of the frame signature distribution even over that obtained using a single transformation. More specifically, when using such multiple transformations, incoming signature words are categorized as either belonging to a clump or not belonging to a clump, that is, a concentration of frame signature occurrences (or greater frequency of occurrences) at a certain signature value or range of values. This categorization is performed by determining the distance, for example, the Hamming distance, of an incoming frame signature from a model template. Hamming distance refers to the number of bits which are different between two binary words and the model template contains the frame signature or signatures which represent the center of a clump. If the incoming frame signature lies within a predetermined Hamming distance or number of bits from the model template frame signatures, the respective signature is transformed using an appropriate one of the plurality of the transformations. A Hamming distance of either one or two bits from the model template provides an improved signature distribution, with a distance of two bits being preferred.

When a received frame would produce a signature which has a value lying on the border of values produced by different transformations, it is important that the transformation employed yield a signature which will match that of the same frame if subsequently received. To avoid sensitivities to the influence of noise which might result in the production of different signatures for the same frame received at different times, in such borderline cases frame signatures are produced by using both transformations whereupon mask bits are set in each corresponding mask word for any corresponding bits in the signatures produced by the different transformations which differ from one another. Accordingly, by carrying out a vector transformation of a difference vector representing the information content of a frame, it is possible to reduce correlation between the elements thereof thereby improving the evenness of the distribution of frame signatures which otherwise would become concentrated about certain values. A particularly advantageous technique employs a Hotelling transform to reduce the covariance between the vector elements, such that their correlation is thereby reduced.

Anti-jitter Masking

An anti-jitter masking module is implemented by each of the channel boards 402 and is adapted for making the video frame signatures less sensitive to horizontal and vertical shifts in the video picture which may vary from broadcast to broadcast. Such horizontal and vertical shifts may be due to hardware timing instabilities or to instability in the transmitted video signal.

More specifically, the anti-jitter masking module compensates for both short term horizontal and vertical shifts known as jitter and/or systematic offsets which may be caused by the transmitting hardware or by the receiving hardware. As is appreciated, the systematic offsets may also be compensated by the edge detection module, as previously described.

As described above, both a 16-bit signature word and the corresponding 16-bit mask word are generated for each video frame. Each bit in the mask word corresponds to a bit in the signature word. By setting a bit in the mask word, portions of system 10 (FIG. 1) which utilize the video frame signature are effectively warned that the corresponding bit in the video frame signature should be considered unreliable. For example, this warning is used in selecting the keyword and matchwords for a key signature and in setting the error threshold for finding a match using a given key signature. Further, since errors which occur on bits in a frame signature word which correspond to bits set in the mask word are expected, this warning is also utilized in the correlator 420 of the segment recognition sub-system 26 to determine error counts in the matching process.

Figure 6:
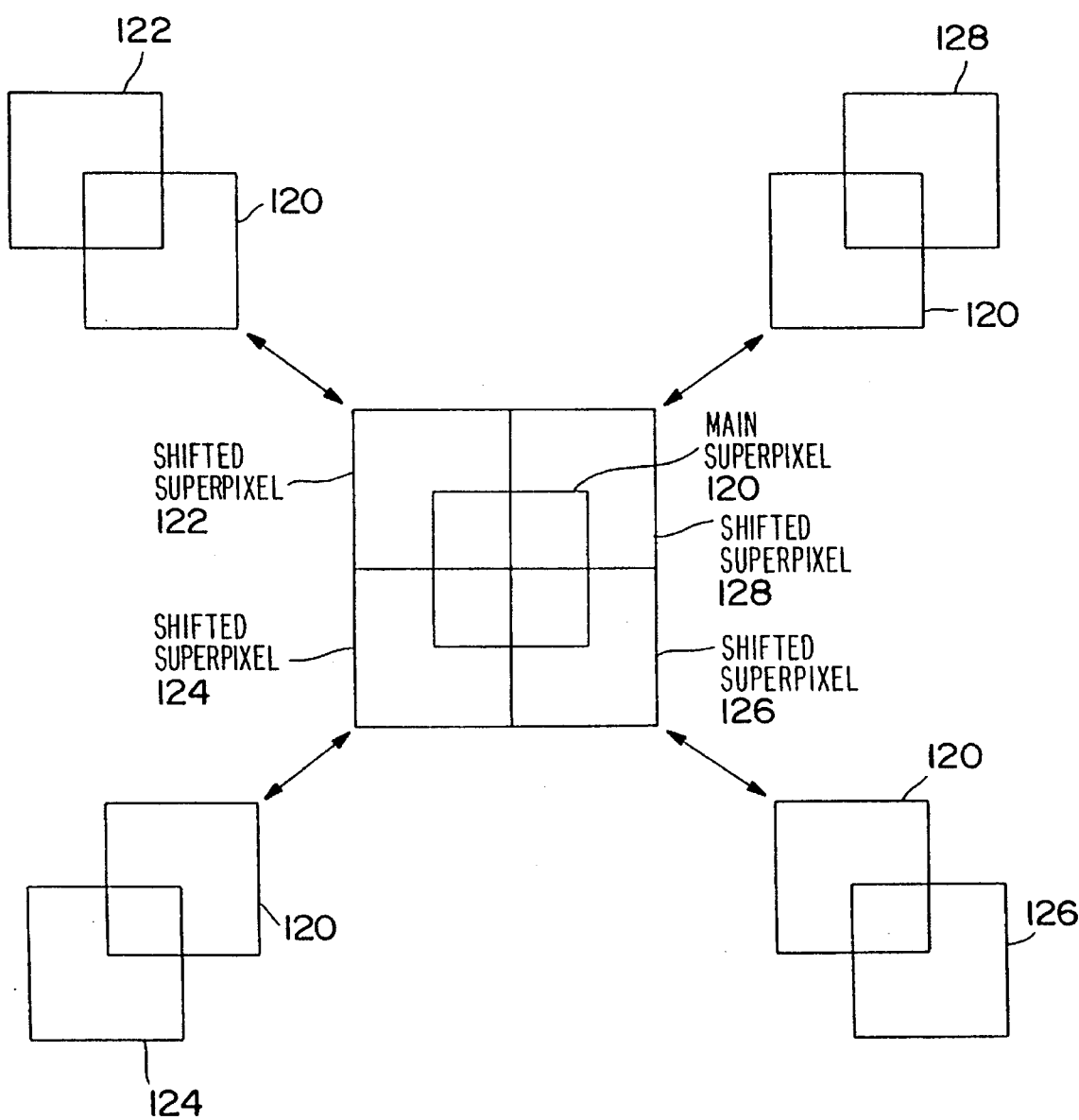
FIG. 6 is a diagram to which reference is made in explaining an anti-jitter masking technique.

The anti-jitter masking module produces respective sums of pixel luminance values for each superpixel area and a predetermined number (for example, four) of adjacent superpixel areas. In an advantageous embodiment, the adjacent superpixel areas include an area which is shifted up and to the left of the respective superpixel area, an area which shifted up and to the right of the respective superpixel area, an area which is shifted down and to the left of the respective superpixel area, and an area which is shifted down and to the right of the respective superpixel area. From each of these five superpixel areas, that is, the respective superpixel area and the four shifted superpixel areas, respective sums of the luminance values of the pixels contained within the areas are produced. Similar values are obtained for the other 31 superpixel areas contained within each video frame to produce four sets of thirty-two values each for a corresponding shifted group of superpixel areas. Afterwards, five video frame signatures are generated, that is, one by utilizing the 32 unshifted superpixels and four by utilizing each of the four sets of 32 shifted superpixels. FIG. 6 illustrates this exemplary process carried out for one superpixel. In FIG. 6, a main superpixel 120, which has a size of four pixels wide by four pixels high, is shifted in the above-described manner by two pixels in the vertical and two pixels in the horizontal direction. That is, a superpixel area 122 is located by shifting a sampling area two pixels up and two pixels to the left from the main superpixel 120. Similarly, superpixel areas 124, 126 and 128 are also obtained by shifting a sampling area by two pixels down and to the left, by two pixels down and to the right and by two pixels up and to the right.

If any bit in the video frame signatures corresponding to the four shifted superpixel areas differs from that in the video frame signature obtained from the unshifted (main) superpixel area, then that bit is considered to be sensitive to jitter whereupon the mask bit which corresponds to this bit is set. It is appreciated that, by so examining each of these respective superpixel areas, the anti-jitter masking module determines whether the value of a particular bit contained within the video frame signature word would change if there was a shift in the video picture which corresponds to the shift used to obtain the shifted superpixel.

The amount by which the superpixel 120 of FIG. 6 is shifted in the vertical and horizontal directions may be varied. To some extent, the greater the shift in the vertical and horizontal directions of the superpixel 120, the larger the shift in the vertical and horizontal direction of the video signal which can be compensated by the anti-jitter module. However, a relatively large shift of the main superpixel area 120 in the vertical and/or horizontal directions may result in a relatively large number of bits being set in the mask bit word. It is appreciated that, if too large a number of bits is set in a mask word, the corresponding frame signature word contains almost meaningless information. For example, if the main superpixel 120 is shifted a relatively large amount in the horizontal and/or vertical directions, the results obtained therefrom would indicate that most if not all of the bits are sensitive to jitter. As previously described, in one embodiment of the present invention, each main superpixel 120 is shifted two pixels in the horizontal direction and two pixels in the vertical direction. In another advantageous embodiment of the present invention, each superpixel 120 is shifted one pixel to the right and to the left in the horizontal direction but without a vertical shift.

Thus, the anti-jitter masking module sets bits within the mask bit word for corresponding bits contained within each video frame signature which may be sensitive to jitter or offsets. Further, the anti-jitter masking module, like the edge detection module, is primarily included in a software program of the segment recognition sub-system 26 and, as such, requires minimal cost to implement in each of the local sites 16.

The anti-jitter masking technique is preferably carried out in combination with a guard band masking technique in which the mask bit for a given frame signature bit is masked if the absolute value of the difference between the average luminance values of the two corresponding superpixel areas is less than a predetermined guard band value. For example, if luminance values for a given video signal are digitized within a scale of zero to 256, an exemplary guard band value of 64 may be selected. If the mask bit of a corresponding vector element is set, the mask bit of the respective signature bit is set. That is, the mask bit of any given signature bit is set if either guard band masking or anti-jitter masking sets such mask bit.

AUDIO SIGNATURE GENERATION

Figure 7A:
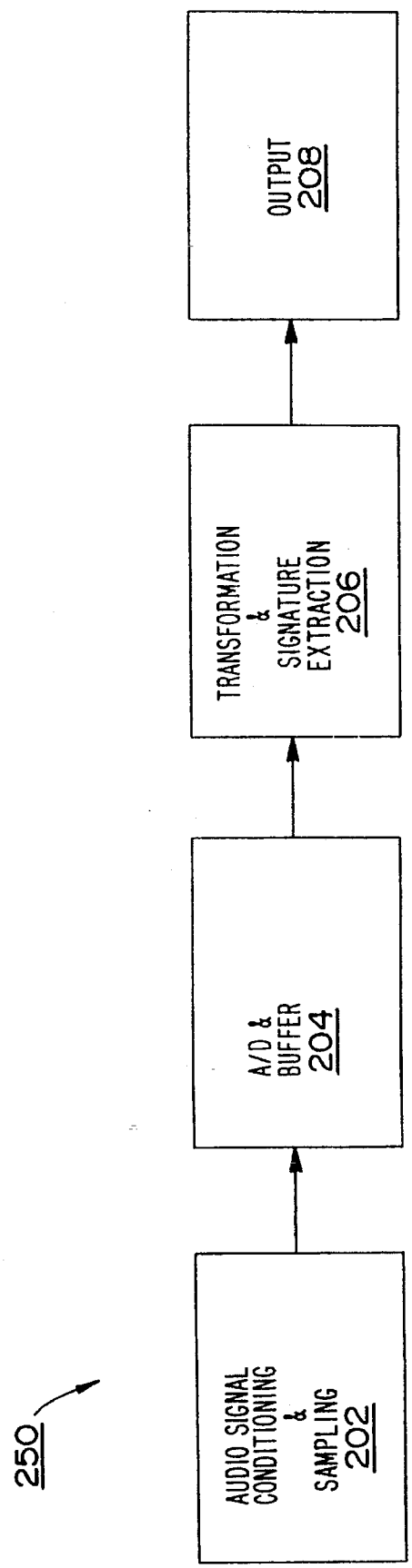
FIGS. 7A and 7B are block diagrams illustrating an audio signature generation system.

With reference to FIG. 7A, audio signatures are generated by an audio signature generation assembly 250 illustrated therein incorporated in each of the channel boards 402 (FIG. 3) for each broadcast channel of audio data which is to be monitored. The audio signature generation assembly 250 generally comprises an audio signal conditioning and sampling circuit 202, an A/D conversion and input buffer circuit 204, a transformation and signature extraction module 206 and an output circuit 208. More specifically, a baseband audio signal from one broadcast channel is supplied to the circuit 202. In a preferred embodiment, the audio baseband signal is low pass filtered by the circuit 202 to satisfy the Nyquist criterion and to emphasize voice signal content over music and other sounds, which simplifies processing and memory requirements without sacrificing needed informational content, since the overwhelming majority of television audio signals contain human speech. The band limited signal from the circuit 202 is supplied to the circuit 204 for conversion into digital form. The digitized audio from the circuit 204 is supplied to the transformation and signature extraction module 206 which utilizes a Fast Fourier Transform process (FFT) for generating audio frame signatures and corresponding mask words. The audio signatures and mask words are supplied to the output circuit 208 for conversion to a form suitable for output from the segment recognition subsystem 26. The audio signature generation assembly 250 is shown in more detail in FIG. 7B which will now be described.

Figure 7B:
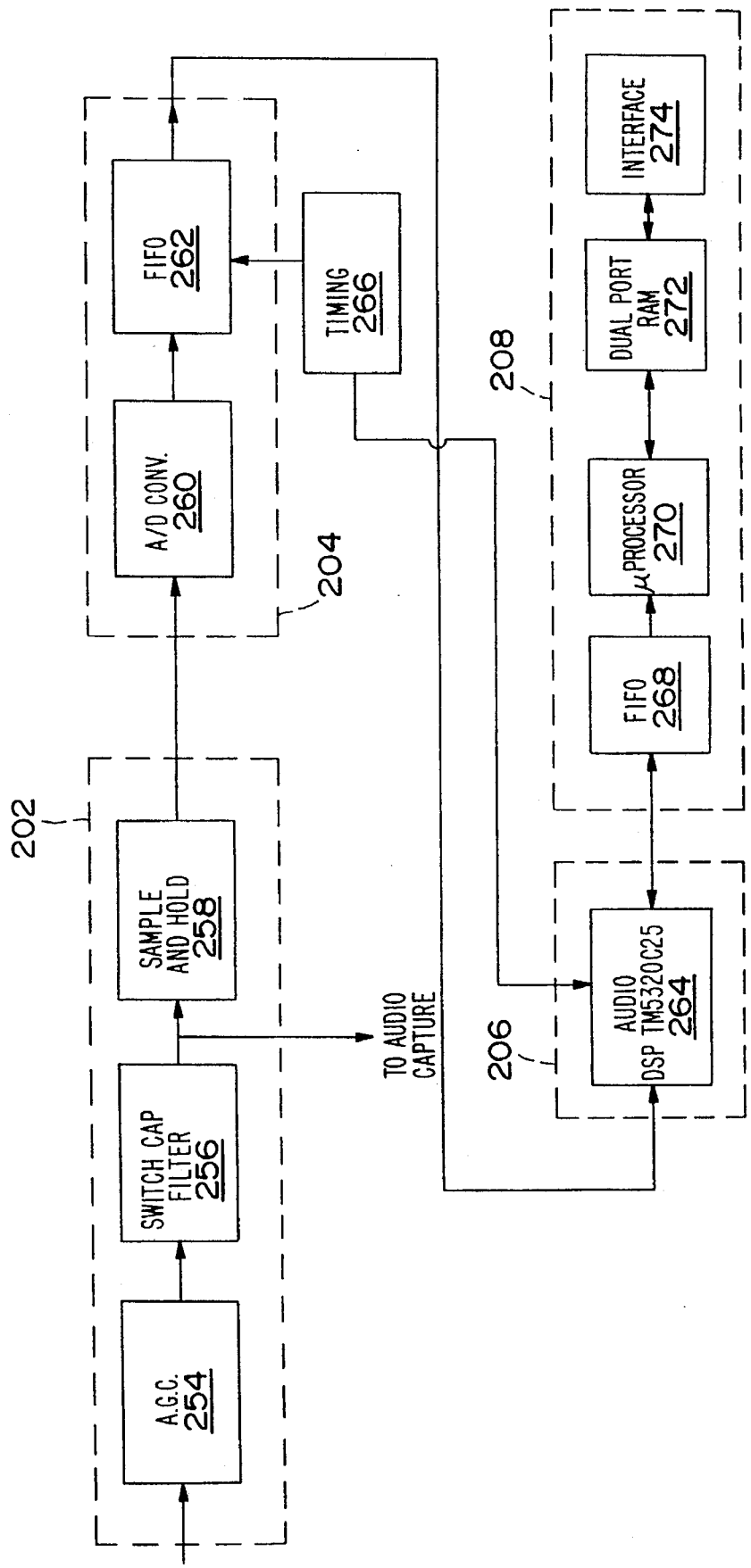

As shown in FIG. 7B, the audio signature generation assembly 250 includes an analog portion (which contains the audio signal conditioning and sampling circuit 202) and a digital portion (which contains circuits 204 and 208 and module 206). The circuit 202 comprises an automatic gain control (AGC) circuit 254, a switched-capacitor filter 256 and a sample and hold circuit 258. More specifically, a baseband audio signal from one broadcast channel is supplied to the automatic gain control (AGC) circuit 254 to maintain a relatively uniform audio power level. That is, since the Fast Fourier Transform (FFT) processing accumulates audio power during normal processing, it is desirable to prevent the audio input power from becoming relatively large to avoid clipping of the output FFT processed signal. An output signal from the AGC circuit 254 is supplied to the switched-capacitor filter 256 which, in a preferred embodiment, is a low-pass filter having a 3 dB roll-off at a frequency of approximately 3200 Hz, since the power density spectrum for speech falls off rapidly at frequencies above 3 kHz. The output signal from the switched-capacitor filter 256 is supplied for audio signal capture (described hereinbelow) and is further supplied through the sample and hold circuit 258 to the A/D conversion and input buffer circuit 204. It is appreciated that in the alternative, unfiltered audio signals may be supplied for audio signal capture.

The circuit 204 comprises an analog-to-digital converter 260 and a first-in-first-out (FIFO) buffer 262. The output signal from the sample and hold circuit 258 is supplied to the analog-to-digital converter 260 which receives a timing or sampling signal, which is derived from a video horizontal synchronization pulse signal, from a timing circuit 266. In a preferred embodiment, the sampling signal has a frequency of approximately 15,260 Hz. As a result, the converter 260 samples the received audio data with a sampling rate of approximately 15,260 Hz. The output from the converter 260 is supplied to the FIFO buffer circuit 262. The output from the FIFO circuit 262 is supplied to an audio digital signal processor 264 included in the transformation and signature extraction module 206. The digital signal processor 264 serves to process the received audio data to create audio signatures and corresponding mask signatures whose data format and timing corresponds with that of the video frame signatures and mask words for simplification of further processing. Timing signals for the digital signal processor 264 are supplied from the timing circuit 266. The output signal from the digital signal processor 264, which includes the audio signatures and the corresponding mask words, is supplied to the output circuit 208.

The output circuit 208 comprises a first-in-first-out (FIFO) buffer circuit 268, a microprocessor 270, a dual port RAM 272 and an interface circuit 274. The output signal from the digital signal processor 264 is supplied through the first-in-first-out (FIFO) buffer 268 to the microprocessor 270. Since the processing rates associated with the digital signal processor 264 and the microprocessor 270 may differ, the FIFO circuit 268 buffers the data from the digital signal processor for supply to the microprocessor. The microprocessor 270, which may be an Intel 80188, serves to extract the audio signature and mask word data received from the FIFO circuit 268 at predetermined intervals. This extracted data is thereafter supplied through the dual port RAM circuit 272 to the interface circuit 274. Since the output data signal from the Intel 80188 microprocessor 270 has an 8-bit format while the interface circuit 274 is designed to transfer data signals having a 16-bit format, the dual port RAM circuit 272 buffers the received 8-bit data to output 16-bit data therefrom.

The processing performed by the digital signal processor 264 in creating the audio signatures and the corresponding mask signatures will now be described more fully.

The processing performed by the digital signal processor 264 is synchronized to the corresponding video fields such that a complete processing sequence is repeated every video frame. More specifically, the digital signal processor 264 transforms 256 words of audio data received from the FIFO circuit 262 into 128 complex data points by averaging adjacent ones of the 256 words and by setting the imaginary words to zero. This reduces the data rate to approximately 7.6K digital samples/second. It will be appreciated that the input data rate for FFT processing satisfies the minimum sampling frequency requirement so that aliasing is avoided. A 50% overlap in the Fast Fourier Transform is obtained by using the 128 complex data points which were generated for the previous field along with the new 128 complex data points for the current field. This data overlap has the effect of allowing fair contribution of all the data points within the window including the boundary points.

Figure 8:
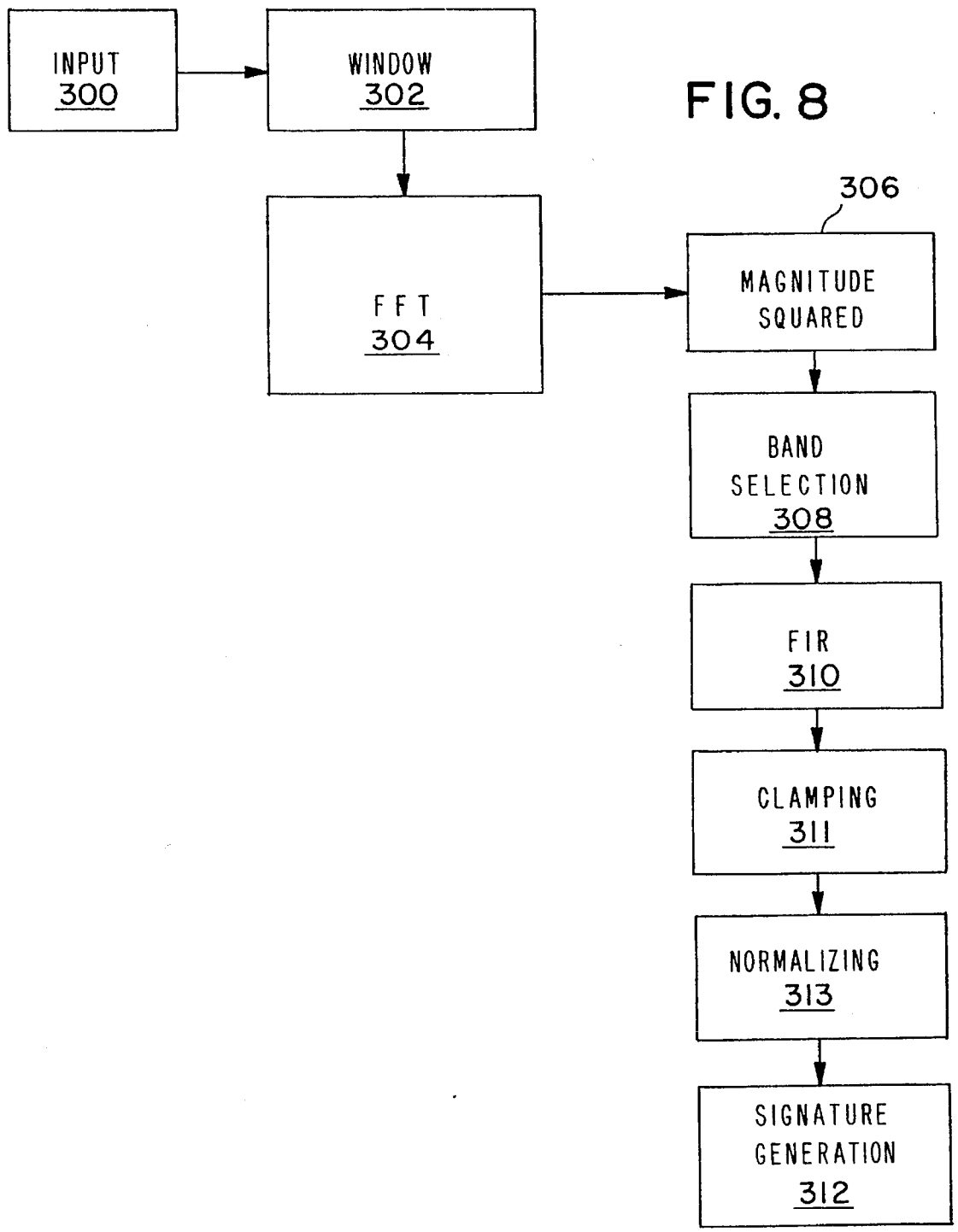
FIG. 8 is a diagram to which reference is made in explaining the operation of the audio signature generation assembly of FIGS. 7A and 7B.

With reference to FIG. 8, which generally illustrates the sequence of processing steps carried out by the processor 264 the above complex data points are generated by an input module 300 and thereafter a window module 302 multiplies the complex data points by window coefficients, which in a preferred embodiment effects a Hanning or cosine squared windowing process. In such cosine squared windowing, the amplitude of an audio signal sample is multiplied by a factor which is proportional to the square of the cosine of an angle which corresponds with a location in time of the respective sample within the corresponding frame interval. Such multiplication reduces the presence of signal spikes at either end of the frame interval and injects a degree of periodicity into the audio data signal to improve the results of the FFT processing. More specifically, since Fast Fourier Transform processing is primarily designed for use with periodic signals, if the signal being transformed is not substantially periodic, the transformed signal may be incorrectly spread across several frequency bands. Processing the complex data points with window coefficients, such as those associated with a cosine squared window, minimizes the tendency for such signal spreading. The previously described data averaging process and overlapping process, together with the cosine squared windowing process, provides a processing base which minimizes frame-to-frame timing differences in the received audio signal and permits equal frequency contributions to each portion of the audio spectrum of interest.

The multiplied data produced by the window module 302 are processed by an FFT module 304 which performs a 256 complex point radix-2 DIF (decimation in frequency) transform using the appropriate weighting or twiddle factors, which may be stored in a look-up table which is downloaded to the digital signal processor 264 from the control computer 30 (FIG. 2) during a start-up protocol. The FFT module 304 effectively implements 256 different bandpass filters. The output produced the FFT module 304, which represents both magnitude and phase information of the audio signal in each band, is supplied to a magnitude squared module 306 to obtain a power or magnitude-squared value for each of the bands within the frequency spectrum. As a result, the phase information from the FFT module 304, which is not needed in subsequent processing, is effectively discarded by the module 306 and is not supplied therefrom.

The magnitude squared module 306 produces magnitude squared values representing the power of the complex spectral points output by the FFT module 304. Due to symmetry, only the first half of the power spectrum is calculated. The result of the square operation is a 30-bit number plus 2 sign bits, of which only 16 bits are saved. Generally, the values are small, so that a saturation scaling process is employed whereby the upper 16 bits are saved after shifting each data word left by a predetermined number of bit places (for example, 6 bit places). If the shift causes an overflow, the resulting word is set to a saturation value of FFFF (Hex).

The values produced by the magnitude-squared module 306 are processed by a band selection module 308 to select frequency band values for a predetermined number of bands. The band selection is performed in accordance with predetermined instructions stored in a look-up table which is downloaded to the digital signal processor 264 during the start-up protocol. In a preferred embodiment, the frequency band values of 16 bands are selected and processed by a finite impulse response (FIR) filter module 310. The FIR filter 310 performs a 15-stage finite impulse response filter operation on each of the received 16 frequency band values. Coefficients for the FIR filter 310, which in a preferred embodiment are Hamming window coefficients selected to carry out a lowpass filtering operation, are supplied from a look-up table which is downloaded to the digital signal processor 264 during the start-up protocol.

Audio signal timing shifts with respect to the simulcast video are commonly encountered in broadcast television and, if ignored in the audio signature generation process, can result in audio signatures which are out of phase with the corresponding video signatures. This will likely degrade the ability of the system 10 to accurately match incoming segments. The FIR module 310 serves to improve signature stability by averaging the audio spectral data over a number of television frames, thus to enhance the likelihood of obtaining correct signature matches.

By averaging the frequency band values over a number of frames, the processing carried out by the module 310 also serves to maximize frame-to-frame correlation. This tends to create groups of similar signatures having a duration of several frames and referred to as runs. The presence of run lengths permits the generation of audio key signatures which are more likely to match when the same audio segment is again received by the system 10, thus promoting system accuracy and efficiency. Another advantage is that errors resulting from noise, quantization and roundoff are less critical since these tend to be averaged out.

The filtered output signals from the FIR filter 310 are then processed by a clamping module 311 which is adapted to clamp the filtered output signals between predetermined high and low values. Clamping the filtered signals to a predetermined high value prevents overflows which may otherwise occur during subsequent processing, whereas clamping the filtered signals to a predetermined low value prevents possible division by zero and the predetermined clamping values are selected accordingly. For example, where the averaged frequency band values to be clamped are provided as 16-bit words ranging in value from 0-FFFF (Hex), a lower clamping value of F (Hex) may be employed, while an upper clamping value of 3FFF (Hex) may be employed.

The output produced by the clamping module 311 is then processed by a normalization module 313, whereupon each of the values obtained by the clamping module are normalized in a predetermined manner. This normalization may be performed for several of the 16 clamped band values by dividing the respective value of each band by the sum of the values in the bands both above and below the respective frequency band. At the edge of the frequency spectrum, however, values from bands either above or below the edge band are utilized (or else only a single adjacent band value is employed). In other situations, however, values from three bands may be utilized in determining the normalized value for a respective band. This normalization process may be represented as follows:

$$Bn \text{ normal} = \frac{B_n}{B_{adj}} \tag{6}$$

in which, $B_n$ represents the clamped value for a respective band n, $B_{adj}$ represents the clamped value(s) for the adjoining band(s). Table I below illustrates the adjoining band(s) used in determining the normalized value in accordance with a preferred embodiment. By utilizing varying numbers of bands to produce $B_{adj}$ for different frequency bands in the normalization process, the statistical distribution of audio signatures among the keywords can be made more even. As a result, clumping of audio signatures around certain keywords is reduced.

TABLE I

| Band | Center Freq. | $B_{adj}$ |
| --- | --- | --- |
| Band1 | 120 Hz | BAND2 + BAND3 |
| Band2 | 150 | BAND1 + BAND3 + BAND4 |
| Band3 | 180 | BAND2 + BAND4 |
| Band4 | 210 | BAND3 + BAND5 + BAND6 |
| Band5 | 240 | BAND4 + BAND6 |
| Band6 | 300 | BAND5 + BAND7 + BAND8 |
| Band7 | 360 | BAND6 + BAND8 |
| Band8 | 420 | BAND7 + BAND9 + BAND10 |
| Band9 | 480 | BAND7 + BAND8 + BAND10 |
| Band10 | 600 | BAND9 + BAND11 |
| Band11 | 720 | BAND9 + BAND10 + BAND12 |

TABLE I-continued

| Band | Center Freq. | B_adj |
| --- | --- | --- |
| Band12 | 840 | BAND11 + BAND13 |
| Band13 | 960 | BAND11 + BAND12 + BAND14 |
| Band14 | 1440 | BAND13 + BAND15 |
| Band15 | 1920 | BAND13 + BAND14 + BAND16 |
| Band16 | 2400 | BAND14 + BAND15 |

Table I also summarizes an advantageous selection of frequency bands for a signature generation technique based primarily upon the speech content of a television audio signal. The bands 1 through 16 each have a bandwidth of 30 Hz. It is appreciated, however, that a different selection of bands and/or bandwidths may be adopted. In producing $B_{adj}$ for each band $B_n$, it is preferable to employ values from nearby bands as this minimizes any distortions due to time delay differences at different frequencies. That is, signals of relatively close frequencies typically are delayed to a similar degree, although signals of substantially different frequencies can experience substantially different frequency delays.

The normalized band values produced by the normalization module 313 are then processed by a signature generation module 312. Specifically, for each corresponding video frame interval, sixteen such normalized band values are supplied to the signature generation module 312, one for each of the sixteen frequency bands. The signature generation module 312 utilizes a NOW-THEN processing technique to produce sixteen-bit audio signatures such that each signature bit is obtained based on a current value (or NOW value) of a corresponding frequency band and a previously obtained value (or THEN value) of the same frequency band produced from a frame preceding the current frame by a predetermined frame offset. More specifically, the received normalized frequency band values are written into a NOW-THEN circular buffer and the THEN values are obtained utilizing the predetermined frame offsets. The frame offsets may vary from band to band. However, in accordance with an advantageous embodiment, a frame offset of 8 is utilized for obtaining THEN values for each of the sixteen frequency bands. The signature generation module 312 produces a value DVAL for each frequency band in accordance with the following relation:

DVAL=(NOW−THEN)/(NOW+THEN)

The value of each of the 16 bits in the audio signature for the current frame and the bit values of corresponding mask word are determined in accordance with the value DVAL. That is, a signature bit is set to 0 if DVAL for the corresponding band is greater than 0, otherwise it is set to a value of 1. Similarly, each mask bit is set to a value of 0 if the absolute value of DVAL for the corresponding band is greater than a predetermined guard band value GRDVAL. For example, if DVAL has a range of 0–7FFF (Hex), a guard band value of 600 (Hex) may be employed, although different values of GRDVAL may yield acceptable results. The produced audio signature and its corresponding mask word for each frame interval are thereafter supplied from the audio digital signal processor 264 as hereinbefore described.

It is appreciated that the above technique for producing audio signatures which compares corresponding frequency band values displaced in time for each of a plurality of frequency bands can provide advantages over a technique which is based only on frequency or time displaced values, since the disclosed technique includes relatively more information in a given signature and provides a better balance of the types of information included in the signature.

EXPERT SYSTEM

The expert system is a software module which is stored within the control computer 30 and includes a number of "submodules" or programs identified as an occurrence filter, new segment detection and selective capture level submodules. Each of these sub-modules contained within the Expert System will now be described in detail.

Occurrence Filter

As previously mentioned, occurrence match data are supplied from each local site 16 to the central site 12 for compilation in the report 13 as illustrated by FIG. 1. Thus, it is desired to reduce the amount of false match data supplied from the local site 16 to the central site 12 in order to improve the overall accuracy of the system 10 and to minimize the time spent by workstation operators at the central site 12.

Basically, the occurrence filter sub-module receives match reports from the segment recognition subsystem 26 and assesses which, if any, of these received match reports is an erroneous or false match report. These detected false match reports are then excluded from a database of the control computer 30 to avoid transmission of false match reports to the central site 12.

To assess whether a match report is erroneous, the occurrence filter examines each received match report from the segment recognition subsystem 26 in accordance with a plurality of predetermined rules. A preferred set of these predetermined rules will now be described with reference to the flowchart illustrated in FIG. 9.

Figure 9:
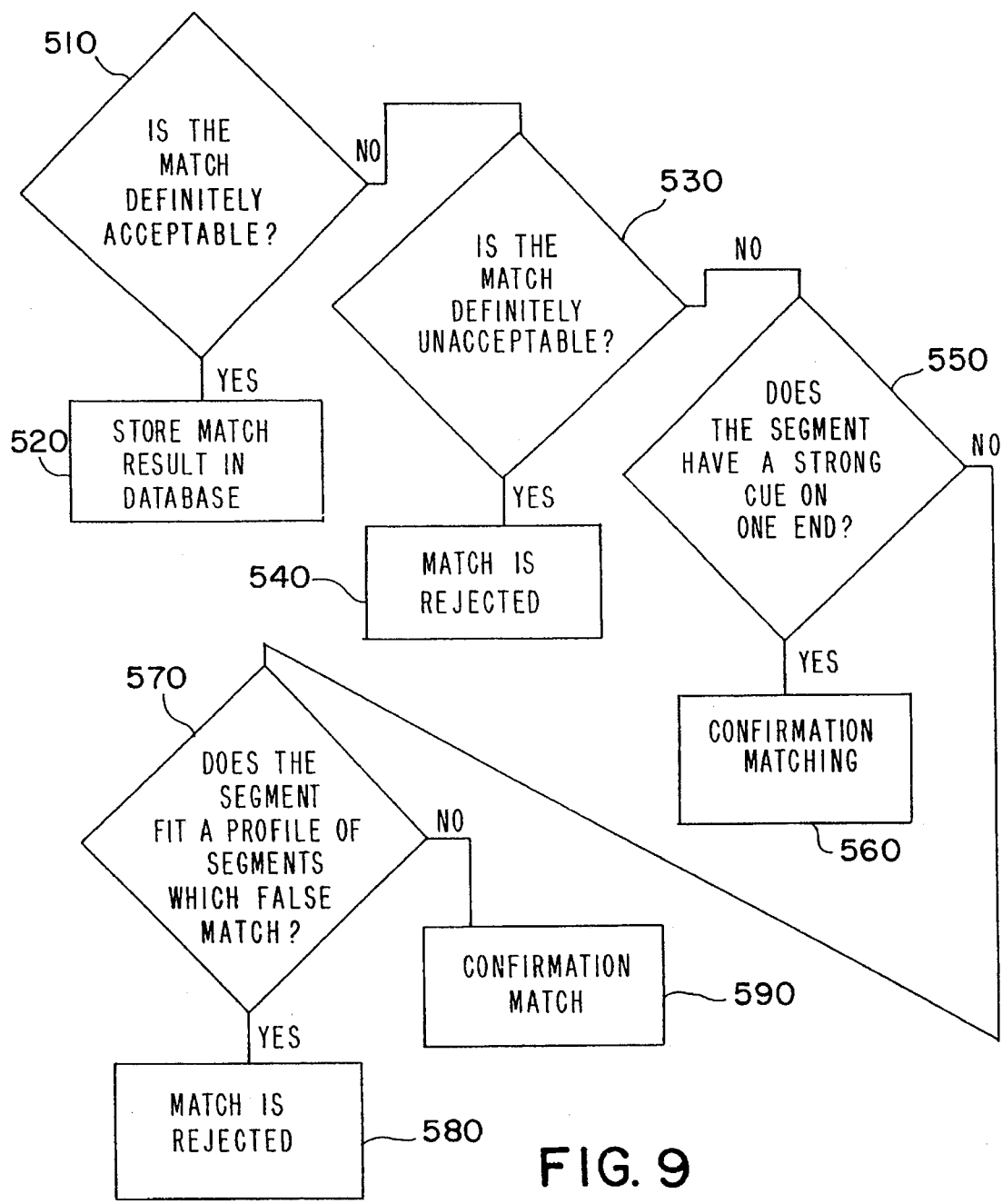
FIG. 9 is a flow chart for explaining an occurrence filtering technique.

As shown in step S10 of FIG. 9, a determination is made as to whether the received match is definitely acceptable. A match is determined to be definitely acceptable if it satisfies at least one of two conditions, that is (1) a match is definitely acceptable if both the audio signature and the video signature for the respective segment have matched, or (2) if both the start and the end of the respective segment are temporally aligned with "strong cues". A cue, as employed in the occurrence filter, is a characteristic of the received signal other than the particular match being assessed by the occurrence filter. Examples of strong cues, as employed by the occurrence filter, are a fade-to-black (especially a fade-to-black of a video signal), as well as a match of a immediately preceding or succeeding signal segment. If the received match is found definitely acceptable in step S10, that is, the match satisfies one of the previously described conditions, the match result is stored within the database of the control computer 30, as indicated in step S20.

If, on the other hand, the match is not found to be definitely acceptable, as indicated by a NO at step S10, then a determination is made as to whether the match is "definitely" unacceptable, as indicated at step S30. A match is determined to be definitely unacceptable if the match is not definitely acceptable (as determined in step S10), if it does not have a strong cue on either end of the corresponding segments, and if its corresponding segment substantially overlaps another segment having a match which is found definitely acceptable. If the match is determined as being definitely unacceptable, then the match is rejected as indicated in step S40 and, as a result, information concerning the match is not stored within the database of the control computer 30.

However, if the match is not definitely unacceptable, as indicated by a NO at step S30, a determination is made at step S50 as to whether the respective segment has a strong cue on one end. If it is determined that the respective segment does have a strong cue on one end thereof, then the received match is subjected to confirmation matching as indicated by step S60, which is described in greater detail below. In this situation, a less stringent tolerance is utilized during the confirmation matching as compared to that employed in a step S90, as hereinafter described. That is the confirmation matching process of step S60 will find a match between signatures having relatively higher match errors than in the case of step S90 so that a match is more likely to be accepted in step S60. The result of the confirmation matching process will determine if the match is to be rejected or is to be accepted.

If, on the other hand, the respective segment does not have a strong cue on one end as indicated by a NO at step S50, then a determination is made, at step S70, whether the respective segment fits a profile of segments which typically false match. If the respective segment fits such a profile of segments which false match, then, as indicated at step S80, the match is rejected and information concerning the match is not stored within the database of the control computer 30.

To determine whether a respective segment fits a profile of segments which false match, a false match rating R is determined for the respective segment. Such false match rating is determined by combining numerical ratings associated with respective ones of a plurality of characteristics in a linear fashion. These characteristics preferably include the following:

1. the length L of the respective segment: segments having a relatively short length are likely to false match;
2. the entropy of the key signature E: the entropy of a key signature is a measure of the dissimilarity between the matchwords within the key signature and is inversely related to the correlation therebetween. The key signature entropy is determined by a key signature generator, as hereinafter described and is thereafter supplied from the segment recognition subsystem 26 along with the corresponding match report. Key signatures having a relatively low entropy are more likely to false match than those having a relatively high entropy;
3. the correlator error threshold T: segments having a relatively high error threshold are likely to false match;
4. the distance D from missing the match: matches with actual correlator error counts which are close to the correlator error threshold are likely to be false matches; and
5. whether (M) the match being assessed was based on an audio or video signal: a match based on a video signal is more likely to false match than one audio based on an audio signal.

In accordance with one embodiment of a method for producing a false match rating, numerical values between zero and one are assigned to the characteristics L, E, T and D (the characteristic M not being utilized in this example) and a linear combination of the assigned values is formed to produce the false match rating R, as follows:

$$R = w_1 L + w_2 E + w_3 T + w_4 D$$

wherein $w_1$ through $w_4$ are respective numerical weights assigned to each of the characteristics for determining their relative importance in the determination of the false match rating R, and the values of the characteristics L, E, T and D have been converted to a normalized scale of zero to one. In the case of a television commercial recognition system, wherein higher values of R represent a relatively lower probability of a false match, exemplary values may be assigned to the characteristic L as illustrated in Table II below.

TABLE II

| Length of Segment (in seconds) | L |
|---|---|
| 10 | 0.0 |
| 15 | 0.30 |
| 20 | 0.40 |
| 30 | 0.80 |
| 45 | 0.95 |
| 60 or more | 1.00 |

In this example, entropy E is measured on a scale of zero to 256, wherein 256 represents maximum entropy. Exemplary normalized values for E are illustrated in Table III below.

TABLE III

| Entropy | E |
|---|---|
| 130 | 0.0 |
| 135 | 0.10 |
| 140 | 0.20 |
| 145 | 0.50 |
| 150 | 0.70 |
| 160 | 0.80 |
| 170 | 1.00 |

Accordingly, the greater the entropy value, the higher the value assigned to E, reflecting the reduced likelihood of a false match for higher entropy values.

Further, in this example, the characteristic T representing the error threshold and ranging from 20 to 60 is assigned the values from zero to one in accordance with Table IV below.

TABLE IV

| Error Threshold | T |
|---|---|
| 20 | 1.0 |
| 30 | 0.90 |
| 40 | 0.70 |
| 50 | 0.40 |
| 55 | 0.25 |
| 60 | 0.0 |

As reflected by Table IV, higher values of the error threshold are assigned relatively lower values T, reflecting the relatively lower probability of a false match for higher error thresholds. Exemplary values for the characteristic D representing the difference between the actual correlator error count and the error threshold are assigned values in accordance with Table V below.

TABLE V

| Distance from Match Miss (in Error Count Units) | D |
|---|---|
| 1 | 0.0 |
| 2 | 0.20 |
| 3 | 0.30 |
| 4 | 0.50 |
| 5 | 0.80 |
| 6 | 1.0 |

That is, the greater the difference between the actual correlator error count and the error threshold, the smaller is the probability of a false match.

Finally, in this example, the weights $w_1$ through $w_4$ are assigned the values listed in Table VI below.

TABLE VI

| Weight | Value |
|---|---|
| $W_1$ | 0.25 |
| $W_2$ | 0.40 |
| $W_3$ | 0.175 |
| $W_4$ | 0.175 |

It will be seen that the sum of the weights is selected as 1.00. Therefore, since the values L, E, T and D have each been normalized so that each falls within a range of between zero and one, the false match rating R will likewise range from a low value of zero (representing a high probability of a false match) to a high value of one (representing a low probability of a false match).

In step S70, if the respective segment does not fit the profile of segments which false match, as indicated by a NO at step S70, then the corresponding match is subjected to confirmation matching as indicated in step S90. The tolerances utilized for the confirmation matching of step S90 are tighter than those utilized in step S60, as previously noted. Further, as in step S60, the results of the confirmation matching process in step S90 will determine whether the respective match is to be accepted and, thus, stored within the database of the control computer 30, or is to be rejected.

Another function of the occurrence filter is to determine whether the received match can be used as a cue for locating new segments or aligning other matches. Basically, the process used to decide whether a match is to be used as a cue is substantially the same as that described above in determining whether a match is acceptable. However, there are two exceptions. That is, (1) a match which appears to be unacceptable and is not near to any strong cues may be used as a cue, in case following matches can be aligned with it or else to find a new segment based upon a following match and, (2) segments which have a strong cue on one end but have a high false match rating, as described above, are not used as cues. However, in the case of exception (2), if confirmation matching later indicates an acceptable match, then the match may be reported to the database.

The storage buffer contained within the data capture subsystem 28, holds only a predetermined limited amount of data. Consequently, the occurrence filter preferably operates or reacts in a timely fashion so as to enable the audio and video data to be collected for a segment which requires such collection, for example, a new segment having a capture level 1 as hereinafter described.

In some instances, for example, when confirmation matching (which is relatively time consuming) is required, the information needed to decide whether a match is acceptable or unacceptable is often not available within the time constraint imposed on the occurrence filter. That is, all of the information needed to determine whether or not to accept a match may not be available at the time the match report is supplied to the control computer 30. To alleviate this problem, the occurrence filter makes a preliminary decision whether the match corresponding to the respective segment should be accepted at the time the match is reported. If a match is determined preliminarily to be acceptable (or is finally determined to be acceptable), it is reported to the database, whereas if the match is unacceptable, it is withheld from the database. The results the preliminary decisions are reviewed after a predetermined period of time, for example, approximately several minutes. During this predetermined time period, the confirmation matching processing is completed. Based upon the confirmation matching results, if a match which was previously not supplied to the database of the control computer 30 is now found to be acceptable, it will be supplied to the database as an acceptable match. On the other hand, if a match which was previously found to be acceptable and, as such, was reported to the database is now determined to be unacceptable, a match rescind signal is produced to delete the corresponding match. In general, matches which are initially determined as being definitely acceptable or unacceptable are not reviewed at the predetermined later time since their determination is not in doubt. However, where a matching audio or video signature is found to be definitely unacceptable before a match is found for the other corresponding video or audio signature, the match of the first signature will nevertheless be accepted since both of the corresponding video and audio signatures have matched.

Thus, with reference again to FIG. 3, the occurrence filter of the expert system 414 receives match reports from the segment recognition subsystem 26 and determines if such reports are false match reports. In certain situations, as discussed above, confirmation matching may be requested, whereupon the confirmation matching module 422, utilizing the segment recognition subsystem 26 as well as key signatures from the database 412 determines whether or not the match is acceptable. The results from the confirmation matching are supplied within a predetermined time period, to the occurrence filter. The occurrence filter supplies matches which are determined to be acceptable to the database 412. If the occurrence filter had previously supplied a match to the database which is later found to be unacceptable, the occurrence filter supplies a match rescind signal to the database control 416 to delete the respective match therefrom.

Confirmation Matching

The confirmation matching module is located within the control computer 30 (FIG. 2) and is utilized to evaluate matches of questionable acceptability at the request of the occurrence filter under the conditions described above. As an example, in certain situations, the audio or video sub-signatures but not both, may match. In this example, the occurrence filter may request confirmation matching to decide if the sub-signature which did not match initially in the recognition controller would nevertheless be regarded as matching a given key signature when compared thereto under standards which are more tolerant of match errors.

The confirmation matching module carries out a matching process which is similar to that utilized by the correlator 420 (FIG. 3) in the segment recognition subsystem 26. However, unlike in the correlator which is attempting to match keywords against a continuous stream of video and audio signatures, the confirmation matching module is attempting to match only one short length of a broadcast segment against one key signature. As a result, false matching is less likely to occur with confirmation matching than with the matching process performed by the correlator. Accordingly, error tolerances for the confirmation matching process can be considerably lessened or relaxed as compared to those employed in the correlator matching process, without resulting in an unacceptable false matching rate. This relaxation of error tolerances enables the confirmation matching module to determine whether a signature or sub-signature should have matched even though the correlator was unable to so determine.

Referring again to FIG. 3, a confirmation match request may be supplied from the occurrence filter module of the expert system 414 to the confirmation matching module 422. Such request may include the segment identification number, start and end times of the segment, the broadcast channel and a desired confirmation match tolerance. Upon receipt of such a match request signal, the confirmation matching module requests the segment signature data for the requested times from the segment recognition subsystem 26 and the relevant key signature from the database 412. After receipt of the requested information, the confirmation matching module 422 then compares the single key signature to the requested portion or segment of the broadcast signal in accordance with the desired confirmation match tolerance and, upon completion of the comparison, supplies the result (i.e. a match or no match) to the occurrence filter module.

Figure 10:
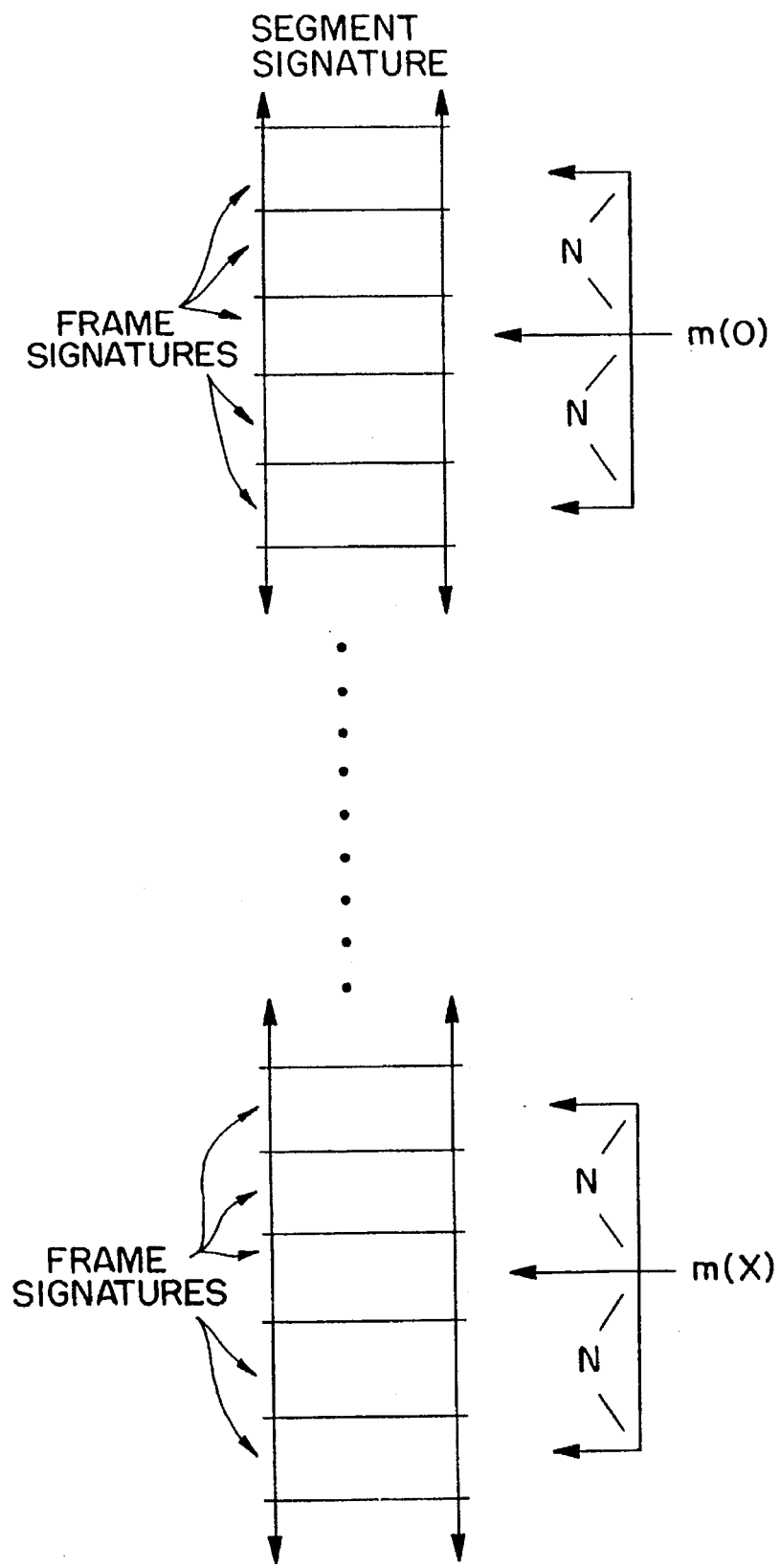
FIG. 10 is a diagram for explaining a confirmation matching technique.

The confirmation matching module performs the comparison by effectively moving the key signature along the segment signature as shown in FIG. 10. Essentially, the key signature is aligned with the segment signature at an initial position within an expected match zone and a match is attempted according to the match confirmation process described below. Each of a multiple of confirmation matches are also attempted by aligning the key signature at corresponding positions offset from the original position, respectively, by ±1, 2, 3, . . . , N frames. That is, in FIG. 10, N represents the number of frames which are to be checked on either side of the location within the expected zone of match, m(0) represents the respective keyword (which in confirmation matching is treated simply as another matchword), and m(x) represents the xth matchword in which $1 \leq x \leq 8$. Generally, the confirmation matching module computes a minimum total error count among all of the 2N+1 matching attempts which it compares to the sum of the error thresholds permanently assigned to the key signature and a confirmation match tolerance to make a decision whether a match exists.

More specifically, while the algorithm utilized by the confirmation matching module corresponds with that utilized by the correlator 420 in most respects, certain differences exist. These differences will now be described with reference to FIG. 10.

For each attempted confirmation match, a respective partial error count p is produced for each key signature match word, by comparing the matchword to the corresponding frame signature from the segment signature. A total error count is then determined by summing the number R (which has an exemplary value of 8) of the lowest partial error counts for each attempted match. In the preferred embodiment, since the keyword is considered simply as another matchword, the respective key signature contains nine matchwords. Thus, in calculating the total error count for each attempted match, the partial error count having the highest (or worst) error count is not utilized. The total error count for each attempted match is calculated for the N frames both before and after the location of the original location as shown in FIG. 7. The value of N should be carefully selected, since if N is too high false matching may result and, on the other hand, a value of N which is too small may not detect acceptable matches. In the preferred embodiment, N has a value of 60. The total error count having the lowest value is selected as the final error count. The final error count is then adjusted to account for any discarded partial error counts. In an advantageous embodiment, this adjustment is performed by using the following relation:

Adjusted Final Error Count=(Final Error Count)(8/R)

The confirmation matching module increases the error count or error threshold associated with the key signature by the error count specified by the confirmation match tolerance to obtain an error threshold value. The confirmation matching module then compares the final adjusted error count with the error threshold value. If the final adjusted error count is less than or equal to the error threshold value, a match is found to exist, whereupon a signal so indicating is forwarded from the confirmation matching module to the occurrence filter module. If, on the other hand, the final adjusted error count is greater than the error threshold value, then a match is not found to exist, whereupon a signal so indicating is supplied to the occurrence filter module.

New Segment Detection

The decision whether a new segment of interest (for example, a commercial) has been received is used to determine the information provided to the workstation operators for identification of such new segments. Referring again to FIG. 1, if the local site 16 identifies segments as complete new segments of interest, when in fact they are not (in which case they are referred to as "chaff"), workstation operator time is wasted in attempting to identify these segments. If the local site 16 does not correctly delineate the segment, so that, for example, only a portion of the audio and video information for the new segment of interest is provided to the operator, the operator's time may also be wasted and system accuracy is reduced.

Detection of new segments is carried out by the expert system and is primarily based upon several explicit and implicit cues. Explicit cues are normally received from the segment recognition subsystem 26 and may, for example, include video fade-to-black, sub-match reports, audio mute and scene changes. On the other hand, an example of an implicit cue is the segment duration. Each of these cues will now be described in more detail followed by a discussion of the operation of the new segment detection module.

Typically, commercials are broadcast with at least one video field having a substantially black level on each end. Since a commercial might have only one field of black on each end of the commercial, a fade-to-black on any field of the video signal is reported by the respective channel board to the new segment detection module through the segment recognition controller. Thus, a commercial boundary may be indicated by a fade-to-black, in which the boundary is normally at the start or the end of such fade-to-black. However, in some instances, the actual commercial boundary may be located in the middle of a fade-to-black. This may occur if nearly black scenes are detected as being black or if during an actual fade-to-black, the video signal begins fading up to the next commercial prior to allowing the fade-to-black to be completed. Although such fades-to-black do occasionally occur which do not correspond with commercial boundaries and which may be detected by the new segment detection module, the number of such spurious fades-to-black is relatively low as compared with the number of such audio mutes or scene changes, which are hereinafter described.

A match which has been accepted by the occurrence filter of the expert system is utilized as cue. As previously mentioned, although the segment recognition subsystem 26 may produce false match reports, the occurrence filter serves to identify and eliminate a substantial number of false match reports. As a result, a match which is determined to be acceptable by the occurrence filter is a reliable cue. Such a match is also considered a relatively very strong cue either alone or especially in combination with a fade-to-black on either or both ends of a segment under consideration. For example, since commercials are typically broadcast in groups, or pods, such that the end of one commercial corresponds with the start of a subsequent commercial, determination of an acceptable match is a strong indication that a commercial is to follow. A match which is determined to be acceptable is also an important cue for informing the expert system where not to find a new segment of interest. As an example, the new segment detection module will not look for new segments in segments which have already had an acceptable match. That is, unlike a new segment, a segment which has already had an acceptable match associated therewith by the expert system, does not need to be forwarded to one of the workstations 14 for classification by an operator as previously described (since such classification has obviously already been performed for a match to have been detected).

Although the end of an acceptable match normally represents either the start of a subsequent segment or the start of a fade-to-black representing the true boundary, the match cue may not be precisely known in time. Since matches can occur on several consecutive frames, each match (audio and video) has a peak width associated therewith which is proportional to the uncertainty in time for the respective match. To compensate for such uncertainty, the new segment detection module attempts to align the respective match using other strong cues, such as another acceptable match or a fade-to-black, whenever possible.

Matches based upon temporary identification numbers (ID's) may represent segments which may differ from segments represented by matches which are based on permanent ID's. That is, matches based on temporary ID's (which have not been classified by a workstation operator) may represent only a portion of a segment, whereas matches based on permanent ID's have been viewed and judged correct by an operator at one of the workstations 14. The new segment detection module of the expert system preferably differentiates between matches obtained with signatures having the different types of ID's to apply greater weight to matches obtained with permanent ID' signatures.

An audio mute representing a reduction of the audio signal substantially to a level representing silence, typically occurs at commercial boundaries. However, since audio mutes are very common throughout a commercial as well as in non-commercial segments such as normal programming, a large number of audio mutes do not indicate a commercial boundary. Accordingly, to rely on audio mutes to detect both ends of a segment can lead to the selection of significant amounts of normal programming as segments of interest, or else incorrectly dividing one commercial into two partial segments, neither of which will correctly match in the future since its length is incorrectly recorded. Thus, an audio mute is considered a relatively weaker cue than the previously described fade-to-black or an acceptable match cue. As a result, the use of an audio mute as cue needs to be restricted or else excessive chaff will be generated. Further, when an audio mute does indicate a commercial boundary, the boundary may not lie exactly at the start or end of the audio mute, but instead may lie at some undefined location within the audio mute. As a result, long audio mutes are typically unusable as cues due to the uncertainty of the exact location of the commercial start or end.

A scene change is a abrupt change in the video picture which occurs between frames. Since scene changes within segments are common, in addition to those occurring at the commercial boundaries, a scene change is considered a relatively weak cue. Nevertheless, scene changes may be very helpful. For example, many commercials which do not have a fade-to-black at a boundary do have a scene change at that point. Although the scene change by itself is a weak cue as previously mentioned, the scene change can be combined with an audio mute to form a stronger cue. For example, the scene change may be utilized to locate the commercial boundary within an audio mute.

Implicit Cues

One of the more important implicit cues is segment duration. Typically, commercials are broadcast in standard or nominal lengths, for example, lengths of 10, 15, 20, 30, 45, 60, 90, or 120 seconds. Some of these commercial lengths occur more frequently than others. In particular, 30 second commercials are believed to occur most frequently. It is believed that the frequency of occurrence of the various commercial lengths is represented as follows, wherein the frequency of occurrence of a commercial of duration t (in seconds) is represented as $CL_t$:

$$CL_{30} \gg CL_{15} \gg CL_{10} > CL_{60} > [CL_{20}, CL_{120}, CL_{90}, CL_{45}]$$

That is, as an example, commercials having a length of 10 seconds are believed to occur more frequently than commercials having a length of 60 seconds. The intervals of the more frequently occurring lengths are considered to provide stronger cues than those associated with the less frequently occurring lengths.

The deviation from the nominal segment length is also part of the segment duration cue. More specifically, commercials or segments of interest rarely conform with the nominal lengths of such segments (for example, 30 secs., 15 secs., etc.). Instead, they are normally slightly shorter or longer than the corresponding nominal length. Typically, a segment is shorter rather than longer than the corresponding nominal length. That is, since each commercial or segment of interest is produced to fit within a predetermined block of time, it is considerably less cumbersome to have the segment of interest slightly smaller than the nominal length whereupon frames (such as fades-to-black) may be added, instead of editing the segment of interest to fit within the predetermined block length. Segments which are longer than the corresponding nominal length are normally the result of errors occurring either at the broadcast station or at the receiving station. For example, it is believed that a most likely length deviation for a new segment of interest is between approximately 0.0 to −0.2 seconds with a peak located at approximately −0.13 seconds. Typically, for a respective segment, the further the length of the segment deviates from the peak nominal length, the less likely the segment is a segment of interest. As is appreciated, the likelihood that a segment is a segment of interest decreases rapidly as the segment length increases over the nominal length.

Since, as previously mentioned, commercials or segments of interest are typically broadcast in groups or pods, when one new segment is detected, this indicates that other new segments may be adjacent thereto. Therefore, a detected new segment is a cue for detecting other new segments. However, the strength of the new segment as a cue depends on the likelihood that the new segment is a new segment of interest which, in turn, depends on the cues upon which the new segment is based.

It is assumed that the probability of detecting a new segment having a predetermined length, with certain cues, which does not correspond to a segment of interest (or in other words a chaff segment) is relatively independent of the length selected. As previously mentioned, interpreting chaff segments as new segments of interest increases the processing time of the system 10 (FIG. 1) and thereby increases the overall operating cost of the system. Thus, it is desirable to select segments as possible new segments of interest having time intervals or segment lengths which are likely to correspond to new segments of interest.

It is considered, therefore, to be more productive to spend operator time searching for segments having a length of 30 seconds which, as previously mentioned, are believed to be common, than it is to spend operator time looking for segments having a length of 45 seconds which are not believed to occur as frequently. While this allocation of operator time means that a 45 second new segment is less likely to be detected than a 30 second new segment, the result is a relatively high overall system accuracy with minimization of operating costs.

Figure 11:
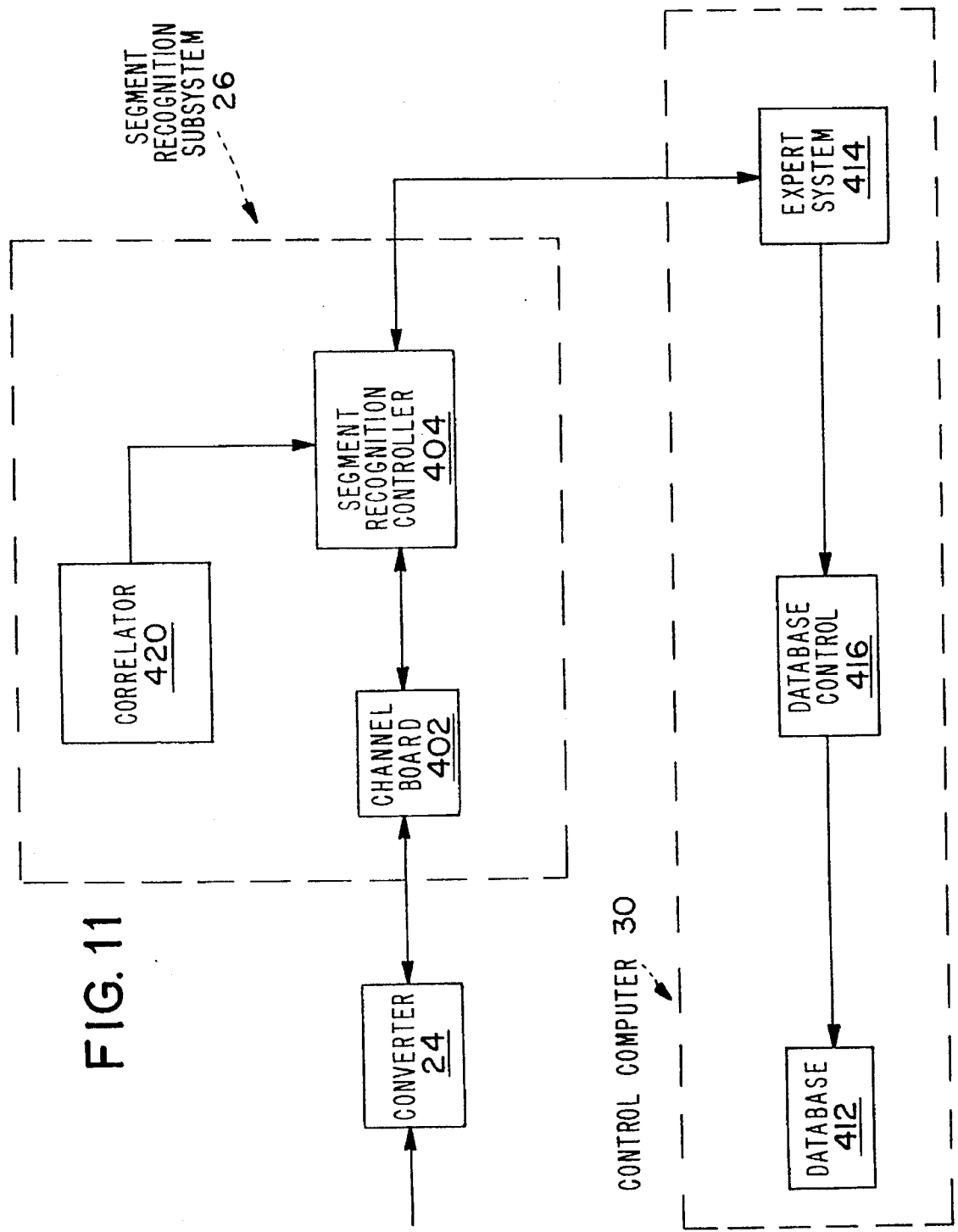
FIG. 11 is a diagram illustrating signal flows in the local site of FIG. 2 when detecting a new segment of interest.

FIG. 11 illustrates the signal flow in carrying out the detection process. A desired broadcast signal in a given channel is received by a respective one of the converters 24 and converted into baseband video and audio signals which are supplied to the channel board 402. The channel board 402 supplies cues pertaining to the new segment of interest to the segment recognition controller 404 which also receives match information from the correlator 420. The cues along with match reports are supplied from the segment recognition controller 404 to the expert system 414. The expert system 414 examines the received information to determine if possible new segments indicated by the cues are new segments of interest. If any of the indicated segments is found to be a new segment of interest, the expert system 414 supplies a signal to the segment recognition controller 404 requesting the respective segment signature which is then collected and supplied to the expert system. Upon receipt by the expert system, such new segment signature is supplied through the database control 416 to the database 412. Further associated signals supplied by the expert system to the database 412 include the time of occurrence, the channel, the segment identification number, the key signature and the audio and video threshold values. Further, in certain situations, as previously described, the expert system 414 may supply an initial A/V capture or threshold value signal to the database control 416 prior to determining a final threshold value. If, in these situations, it is later determined that the initial threshold value was incorrect, the expert system 414 will supply a threshold value change or rescind signal to the database control 416 to correct the entry in the database 412.

The operation of the new segment detection module will now be discussed.

In accordance with one operational node, the new segment detection module scans the cues in a received signal to detect a segment having a standard length for a segment of interest. The first segment detected which has such an interval and satisfies predetermined criteria described hereinbelow is accepted as a new segment of interest. Since the first interval which satisfies such requirements is accepted, subsequent new segments which may conflict therewith (i.e., another segment occurring during the same period of time) are not considered. Therefore, the segment which is detected and accepted is dependent upon the order in which the cues are scanned as hereinafter described.

The cues are stored in a cue deque in which a node is established each time there is an on-off transition of any of the cues. These nodes are sorted by time. Matches are supplied to the deque by the occurrence filter when they are determined to be acceptable for use as cues. These cues are then scanned by either specifying a start location in the deque or by specifying a desired time. If a time is provided, the latest point in the deque which occurred after a predetermined fixed time delay (e.g., approximately 80 seconds) is used as the initial scanning time to compensate for the delay in reporting matches as compared to cue reports.

The cues may be scanned by more than one pass and, in a preferred embodiment, two passes are utilized. The first pass scans for all cues except audio mutes, and the second pass scans the cues for audio mute based segments. This scanning process will now be more fully described.

The cues are scanned backward in time utilizing two nested loops. In an outer loop, the deque is scanned backward for appropriate cues for the tail (or end) of a segment and in an inner loop the deque is scanned backwards from the current tail position in search of appropriate cues for the head of a new segment. In this manner, all possible new segments which contain a plausible cue on each end are detected. Each of the time intervals is evaluated to determine if, given the respective length and the associated cue types, it represents an acceptable new segment of interest. That is, the new segment detection module determines, for a respective segment, whether the cue types are acceptable and then determines if the length of the segment in combination with these cues indicates an acceptable new segment of interest.

If an interval is indicated to be a new segment of interest, it is assigned a segment identification number and is stored in the cue deque as an occurrence. Afterwards, a selective capture level module is utilized to determine an appropriate audio/video capture level value, as hereinafter described. Further, the segment signature is obtained from the segment recognition subsystem 26 and the respective signature is then supplied to the database 412 of the control computer 30.

Figure 12:
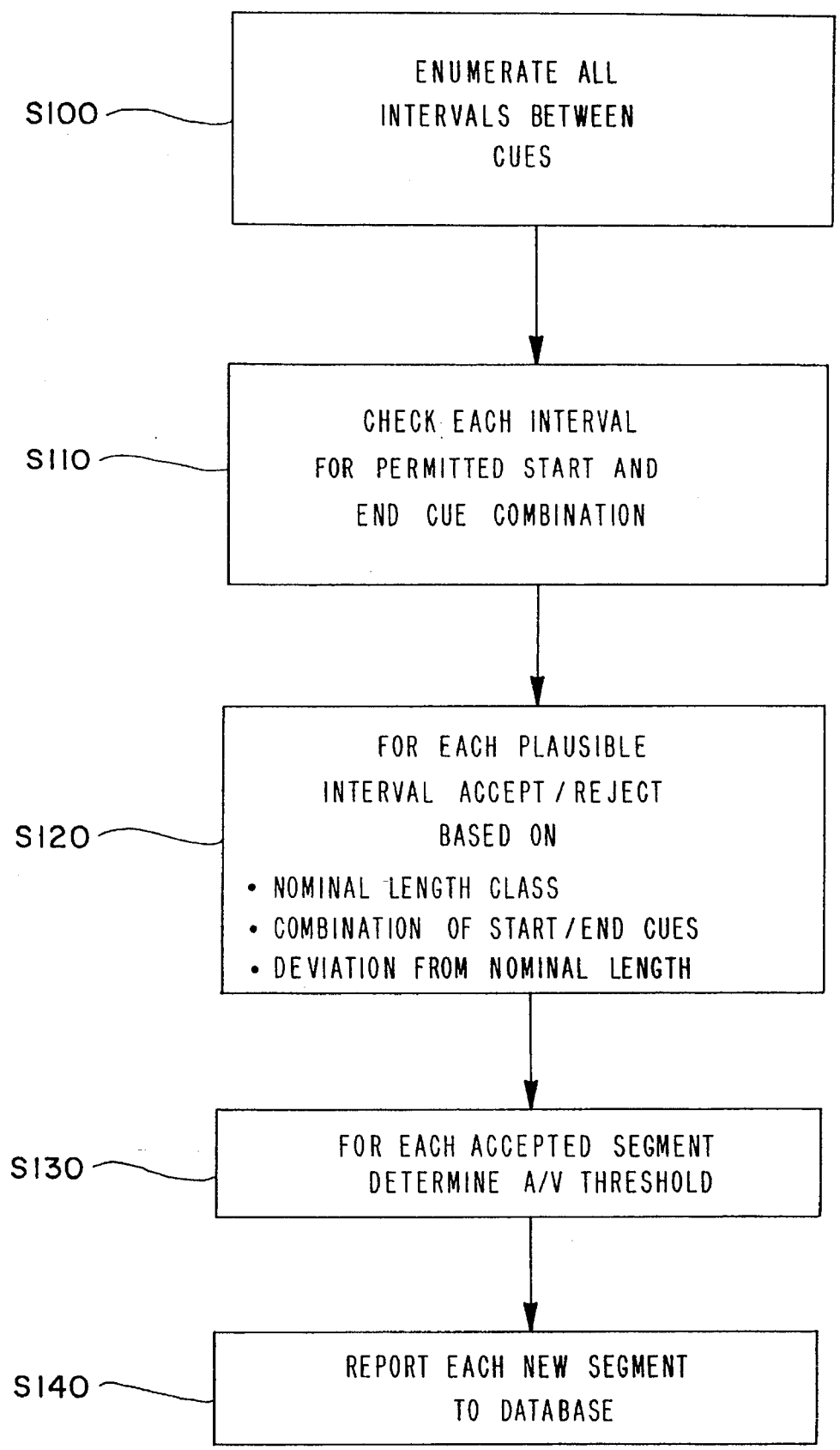
FIG. 12 illustrates a sequence of steps performed in detecting new segments of interest in accordance with a first operational mode.

FIG. 12 illustrates the above-described steps performed by the new segment detection module. As shown therein, processing begins at step S100 wherein a desired portion of the received broadcast is examined to locate all intervals between cues. Afterwards, as shown in step S110, each of the intervals located in step S100 is examined so as to determine if the respective start and end cues are plausible. Thereafter, as shown in step S120, the acceptability of each interval which has plausible cues on its respective ends is determined based upon the respective nominal length of the interval, the deviation from this nominal length and the combination of the start and end cues. If the interval is determined to be acceptable, then as indicated in step S130, the audio/video capture level is determined by the selective capture level module. Thereafter, the newly accepted segment of interest is supplied to the database 412 of the control computer 30 as shown in step S140. If, on the other hand, in step S120, the respective interval or segment is rejected, then further processing for this segment is not performed.

After locating a new segment, the outer loop is reset so as to continue from the start of the newly detected segment. The outer loop terminates upon encountering a cue which has already been checked as a possible tail cue. This can be determined by examining cue examined flags. That is, each node in the deque which has already been checked as a possible tail cue has a cue examined flag set. Since, in the preferred embodiment, there are two scanning passes, there are two cue examined flags. On the other hand, the inner loop terminates when it locates a cue separated in time from the current tail cue by an amount longer than that of any standard segment (e.g., 120 seconds).

Two passes are utilized so that the audio mute based segments may be given a lower priority than other segments. More specifically, in a preferred embodiment, the second pass is at a scan point 30 seconds later than in the first pass. This enables the first pass to locate all segments up to 30 seconds in length which are not based on audio mute cues before checking for audio mute based segments in the second pass. As a result, the lower probability (or less likely to be acceptable) audio mute based segments will not be detected prior to detection of segments of interest having a higher probability of occurrence, for example, those based upon matches and fades-to-black having lengths up to 30 seconds. As previously mentioned, the first detected segment may be utilized without considering any possible conflicting segments (although it is preferable to resolve such conflicts, as described hereinbelow). In such a situation, it is desirable to utilize the two passes as hereinbefore described. Further, since all audio mute based segments are given a capture level 2 by the selective capture level module as hereinafter described, so that the respective audio and video data are not collected when such segments have not been encountered previously, the delay in scanning can be set to an even longer value. This would further minimize blocking of a higher probability based segment by an audio mute based segment.

Determining whether a cue is appropriate for the start or end of a segment involves careful consideration. For example, in the case of an occurrence cue, it may be necessary to ensure that a start occurrence cue which may be useful as a tail cue is not, at the same time, the end of another occurrence. This can be determined by checking that start and end occurrence flags are not both set. As another example, it may be necessary to determine if a fade-to-black is associated with an occurrence, whereupon this occurrence can be used to increase the cue strength. That is, if the start of a fade-to-black is under consideration as a possible segment tail cue, then the end of the fade-to-black should be examined to determine if it is the start of an associated occurrence. If this is so, the strength of the cue can be increased.

The characteristics utilized in the new segment detection module described above to determine the acceptability of a segment-as a new segment of interest will now be more fully described.

The maximum allowable deviation from the nominal length is determined. However, in such determination, the more frequently occurring nominal lengths are favored, by providing them with relatively large deviation tolerances, to increase the chances of detecting a new segment of interest. Separate tolerances are preferably utilized for deviations smaller and larger than the nominal length, in which the tolerance for the deviation shorter than a nominal length is typically larger than that for the deviation larger than the nominal length.

The cues for each interval are used to adjust the maximum allowable deviation from the nominal length for the segment under consideration. This is done by analyzing the cues on the ends of the respective segment to determine which of the cues on each end is the strongest. Occurrence cues are considered to be the strongest, followed in turn by fades-to-black and audio mutes. That is, the tolerance is adjusted according to the strength of the cues on both ends of the segment.

Uncritical use of audio mutes as cues can generate a relatively large number of chaff segments. However, audio mute based segments may be acceptable with an audio mute as a cue on one end provided a relatively strong cue is present on the other end. Further, since audio mutes having a relatively short length occur frequently and audio mutes having a relatively long length normally do not allow accurate determination of segment ends, only audio mutes having a length which lies within a predetermined range are utilized. Nevertheless, all such audio mute based segments are given a capture level of 2 by the selective capture module. To further limit the number of chaff segments detected, only segments having a more frequently occurring nominal length are permitted to be based upon audio mutes as cues. Furthermore, while segments with a match on one end and an audio mute on the other will normally be acceptable, segments having a newly detected segment on one end and a match on the other are not acceptable because the newly detected segment may be based upon an audio mute cue. In this situation, a plurality of segments may be detected as new segments which are based on audio mute cues on both ends. Therefore, segments based on occurrence cues on one end without an associated additional strong cue, for example, a fade-to-black cue, and an audio mute cue on the other end may not be utilized.

The audio mute may be utilized in the splitting of segments. Since commercials having a length of 30 seconds occur most frequently, in a television commercial recognition system, segments having lengths equal to multiples thereof, for example, 60, 90 or 120 seconds, may be split into a plurality of segments each having a length of 30 seconds. These segments may be split by utilizing the audio mute in addition to a scene change as split cues. That is, the segment is examined at each 30 second interval to determine if an audio mute and a scene change are present, whereupon the segment is divided. The splitting of segments in this fashion is different from that performed on long segments, wherein new segments having a length over a predetermined value, for example, 60 seconds are split in two at an arbitrary location even if the above-mentioned audio mute and scene change split cues are not present.

When relatively high numbers of fades-to-black occur, or when a fade-to-black is detected for a relatively long period of time, this normally indicates that a signal having a relatively poor quality is being detected.

Excessive fades-to-black may be the result of a poor signal or noise at the input. Attempting to detect new segments from such a poor quality signal usually results in detecting chaff segments. To correct such a situation, cues are not accepted from a portion of a signal which is determined to have such a relatively high occurrence of fades-to-black. Cues which are thus not accepted may not be used for a new segment start or end cue.

The above described cue rejection is performed by utilizing several factors, for example, the amount of fade-to-black time, the number of fade-to-black on/off transitions as hereinafter described, and the amount of non-fade-to-black time occurring during the previously described inner loop. Variables corresponding to each of these factors are initialized upon detecting a suitable tail cue (before starting the inner loop scanning). Thereafter, as the inner loop is scanning for a head cue, the signal is monitored to detect the above factors. If a possible new segment is detected, the respective segment is examined for the presence of the above factors. If the number of occurrences of these factors in a segment exceeds a predetermined maximum value (for example, a predetermined maximum amount of fade-to-black time and/or a maximum predetermined number of fade-to-black on/off transitions), then the segment is not accepted as a new segment.

Figure 13:
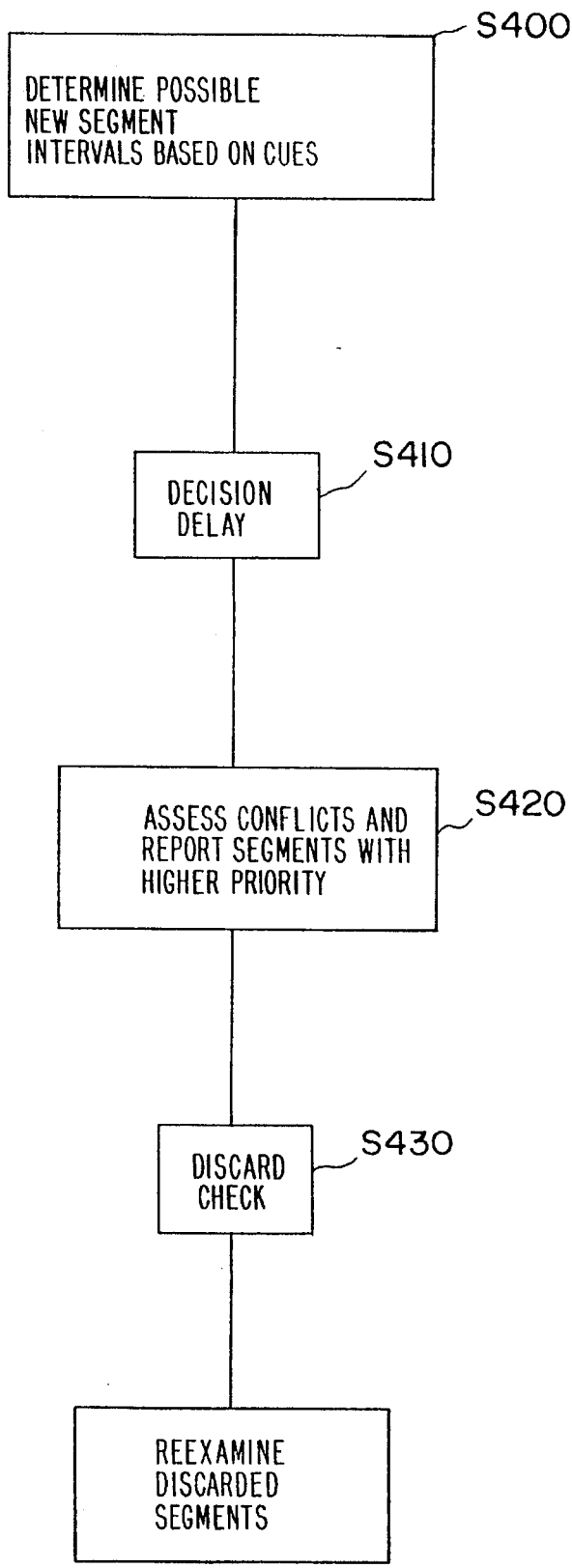
FIG. 13 illustrates a sequence of steps performed in detecting new segments of interest in accordance with a second operational mode.

In accordance with a second operational mode, the new segment detection module carries out the process illustrated in FIG. 13 for detecting new segments of interest. In a first step S400, the new segment detection module scans the cues and picks out all intervals that are reasonable possibilities for new segments and places such intervals in a list of possible segments for later re-examination. Subsequently, processing is delayed in a step S410 for a predetermined interval selected to maximize the possibility that segments which may overlap the already listed possible segments will be detected before it is determined which of the conflicting segments shall be accepted and which discarded. The delay interval may, for example, be at least 35 seconds so that no 30 second segments (which occur most frequently) are lost due to insufficient information on potentially overlapping segments.

After the decision delay, processing continues in a step S420 in which each possible segment is compared with all other segments in the list to determine if conflicts are present. If so, a heuristic is applied to decide which segment shall be accorded a higher priority based upon a linear combination of relevant factors. Such factors include nominal length, associated cues, and deviation from nominal length. Once the conflicting segments have been thus prioritized, the higher priority segment is reported to the database (with possible audio/video collection for viewing at a work station of the central cite) and the lower priority segment is marked as a discarded segment. However, after a further delay, represented by a step S430, the discarded segments are reexamined to determine if a conflict still exists with an accepted segment. If not, the previously discarded but nonconflicting segment is reported to the database as a threshold 2 segment (as explained hereinbelow).

The manner in which the conflict assessment in the prioritizing process of step S420 can result in the later acceptance of a previously discarded segment is illustrated by the following example. In one possible scenario, a segment A is assumed to overlap and occur later than a segment B, while the segment B overlaps and is assumed to occur later than a segment C. It is assumed further that segments A and C do not overlap. If segment B is first compared to segment A, such that segment B is given priority over A, then segment A will be rejected. However, segment B will be compared to segment C, and if segment C is preferred then segment B will also be rejected. Once segment B has been rejected, segment A is no longer conflicting, and it can, therefore, be accepted even after a prior rejection.

Figure 14:
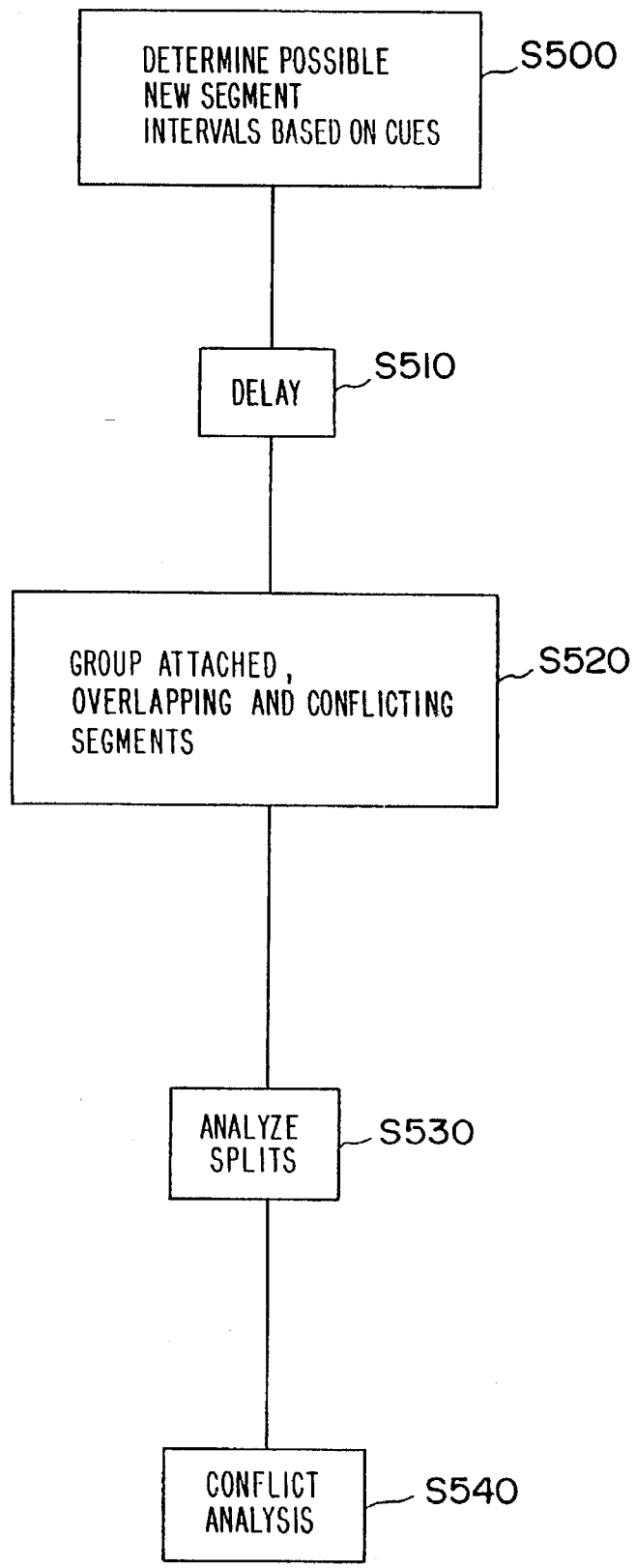
FIG. 14 illustrates a sequence of steps performed in detecting new segments of interest in accordance with a third operational mode.

In accordance with a third mode of operation of the new segment detection module, as illustrated in FIG. 14, in a step S500 the cues are scanned to locate possible segments which would be acceptable as new segments of interest according to the criteria described hereinabove. In a following step S510, processing is delayed, for example, for as long as five minutes to ensure that all related possible segments have also been detected. Thereafter, in a step S520 attached, overlapping and conflicting segments are placed in respective groups of related segments for further processing, for example, by marking a node established for each such segment in an appropriate deque with an arbitrary number identifying its respective group.

Figure 15:
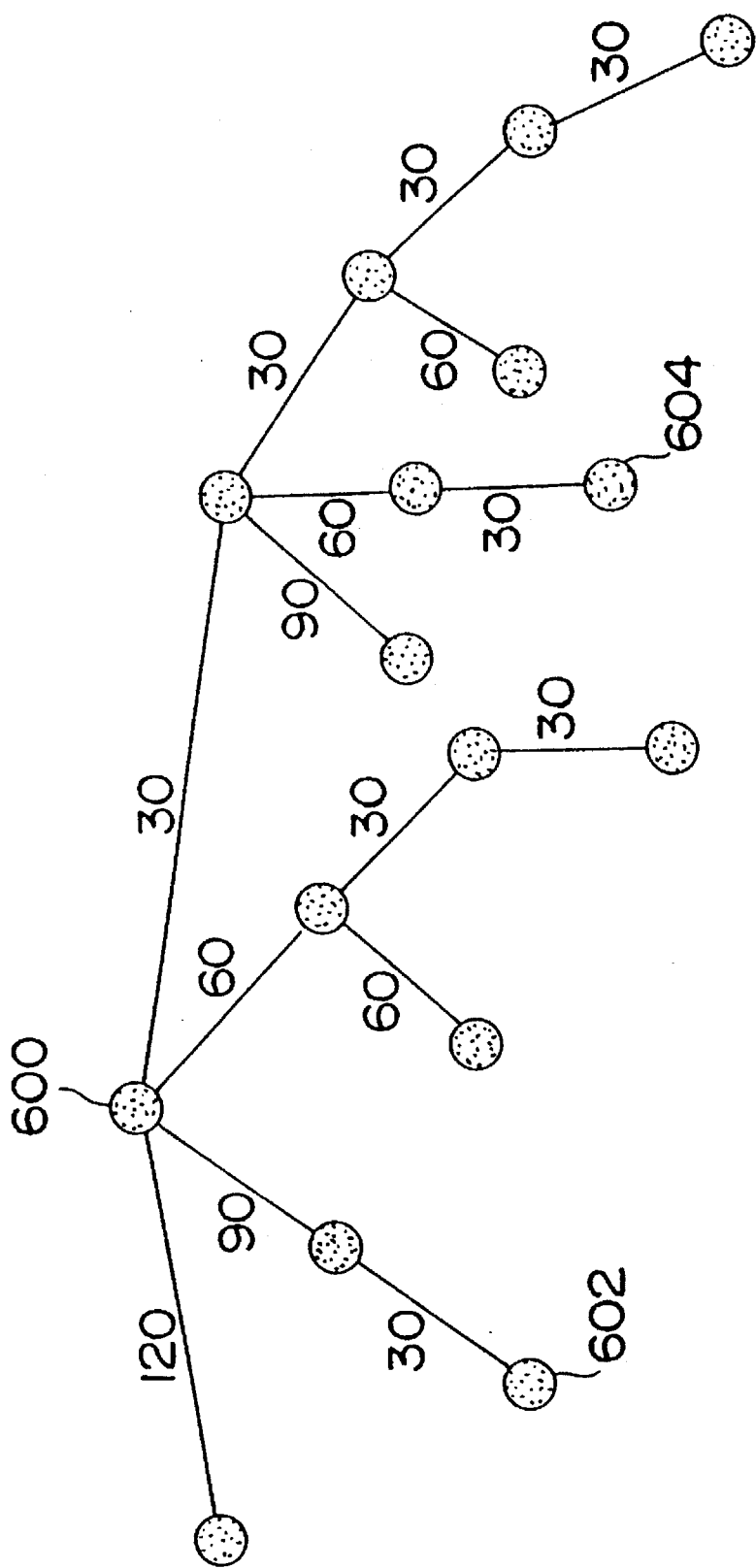
FIG. 15 is a tree diagram used for describing the process illustrated in FIG. 14.

Thereafter, a two step heuristic is carried sequentially in steps S530 and S540. In step S530, the new segment detection module determines the acceptable splits among the various segments under consideration. A split is a possible subdivision or grouping of the identified segments based upon accepted nominal lengths for segments of interest. For example, with reference to FIG. 15, a split tree for a 120 second segment with a fade-to-black at each 30 second boundary therein is illustrated. In FIG. 15, the possibilities for splitting the 120 second segment are arranged in a tree structure where each path from the root 600 to a leaf node (for example, leaf nodes 602 and 604) represents a respective way to split the 120 second segment. The numbers 30, 60, 90 and 120 represent the duration in seconds, or segment length, of a possible segment formed from the main 120 second segment. It is seen that a segment can appear than once on the diagram.

Once the possible ways of splitting the given segment have been defined in accordance with the split tree, the tree is traversed and each path (that is, possible combination of segments) is evaluated in accordance with a set of predetermined rules for determining acceptable splits.

The perdetermined rules which are employed in evaluating the acceptability of the possible splits are based on the normal length of the main segment and the possible sub-segment, as well as audio /video (A/V) thresholds determined therfor as explained hereinbelow in connection with selective capture level determination. Essentially, the rules are designed to avoid A/V threshold splits, that is, a divisional of a segment of interest are designed also to favor splits into frequently encountered lengths such as 30 second segments. For example, an A/V threshold 2 segment is split into a plurality of sub-segments if all sub-segments have an A/V threshold of 1. In addition, a 45 second segment will be split into segments encountered with greater frequency, such as a 15 second segment and a 30 second segment. The various rules themselves are stored in a table permitting future modifications.

If the application of the foregoing rules results in several acceptable splits, the still conflicted splits are prioritized in accordance with the following additional rules. First, splits which yield the greatest duration of A/V threshold 1 segments are favored over others. If there is then more than one split remaining, the splits are rated on a point scale based on the nominal lengths of each segment in the split, such that commonly occurring segment lengths are favored. That is, a points-per-second value is assigned for each nominal length and then multiplied by the length of the segment to accumulate a total points score for each nominal length. For example, if 30 second segments are accorded 3 points per second, while 15 second and 45 second segments are each accorded 2 and 1 point per second, respectively, the 45 second segment would yield a point total of 45, whereas the 30/15 split would yield a point total of 120, which thus favors the split. Accordingly the scale is constructed to favor those splits yielding segments of more commonly occurring lengths. If after application of the foregoing rules, more than one split remains, one is then chosen arbitrarily.

Once the split analysis has been carried out in step S530, conflict analysis is carried out in step S540 according to which the most likely segment among a plurality of segments overlapping in time (which are, mutually exclusive) is given priority. Segments which are part of a split are now considered individually. Each pair of conflicting segments are rated in accordance with a heuristic explained below and the best is chosen. By pairwise comparison, a single most preferred segment is chosen. If after this choice is made, there are less preferred segments which do not conflict with this choice, they are also accepted.

The heuristic is a rating system which generates a linear function of the properties for each segment, namely, nominal length, cues and deviation from nominal length. A score for each value of a given property is assigned based on the following principles. Occurrence cues are considered much stronger than new segment cues which are in turn considered to be stronger than a single fade-to-black. With respect to deviation from nominal length, segments are more likely to be shorter than nominal length than longer, and the more their length deviates from the nominal length, the less probable it is that a segment of interest has been detected. The most probable deviation is between 0–0.2 seconds. In the case of nominal length, as noted above, 30 second segments are the most frequently encountered, followed by 15 second, 10 second and 60 second segments, in that order, while 20, 45, 90 and 120 second segments are considered to be quite rare. Overall, the cues are weighted more heavily than the other two properties. Where, however, the frequency of nominal length property is the only consideration, a special case arises. Namely, if both of the segments under consideration have an A/V threshold of 1 and one segment is contained in the other, generally the longer segment will be preferred and an appropriate point value would then be assigned depending upon the nominal lengths of the two segments.

Selective Capture Level

The selective capture level module serves to reduce processing of chaff segments at the local sites 16 to avoid reporting these to the central site 12 which would waste workstation operator time. A chaff segment is a segment which has been found by the expert system to be a new segment of interest, when in fact it is not. For example, a chaff segment may be a news brief or a portion of normal programming bounded by cues and having the same length as a segment of interest.

Processing of chaff segments increases the processing time of the system 10 (FIG. 1) and its operating costs. That is, a segment that is found to be a new segment of interest, but which is actually a chaff segment, is transmitted from the local site 16 through the central site 12 to one of the workstations 14 for processing by an operator, so that a high chaff rate substantially increases the time that the operators must spend in trying to classify new segments. Thus, treating chaff segments as new segments of interest disadvantageously increases the communication between the local sites 16 and the central site 12, increases the operator workload at the workstations 14 and increases the processing which must be performed at the local site 16.

The selective capture level module divides segments found to be potential new segments of interest into two groups, namely, segments which are more likely to be segments of interest (non-chaff) and segments which are less likely to be segments of interest. The segments which are more likely to be segments of interest are assigned an audio/video (A/V) capture level 1, whereas the segments which are less likely to be segments of interest are assigned an audio/video (A/V) capture level 2. Upon detecting a possible new segment of interest, whether assigned an A/V capture level of 1 or 2, a key signature is produced therefor and stored, as explained hereinafter. The audio and video (A/V) data for a segment having an (A/V) capture level 1 are immediately collected for transmission to the central site upon detection of the new segment of interest. On the other hand, the A/V data for a segment having an A/V capture level 2 are collected only after its previously stored key signature has had at least one match. That is, a segment assigned an A/V capture level 2 will be broadcast and detected at least twice (once to detect the segment as a new segment and once again due to a match on its key signature) before the A/V data associated therewith are collected. If its key signature does not produce a match within a predetermined time period, it is purged from the system.

Only segments which have their A/V data collected are supplied from the respective local site 16 through the central site 12 to one of the workstations 14 (FIG. 1). Most segments of interest are broadcast more than once, while chaff segments are seen only once. Accordingly, by assigning an A/V capture level of 2 to segments which are less likely to be segments of interest, so that their A/V data are not collected until a subsequent match on such segments' key signatures, substantial operating cost savings can be achieved.

In accordance with a technique for assigning capture levels in a television commercial recognition system, a new segment is assigned a capture level 2 if it satisfies one of the following conditions:

1. If the sole cue at either end of the new segment is an audio mute cue. Since, as previously discussed, audio mutes occur frequently both at segment boundaries and within segments, new segments based on an audio mute cue are likely to be chaff segments.

2. If the new segment is not close or proximal to a group or pod of commercials. Since most commercials are broadcast in groups or pods, a new segment is likely to be close to such a pod. Proximity to a pod is advantageously assessed by determining the proximity in time of the new segment to another new segment or a segment having an accepted match. Since the proximity of a segment having an accepted match to the new segment being assessed provides a more reliable indication of pod proximity than the proximity of another new segment thereto, another new segment is considered proximal only if it comes within a proximity range which is narrower than a proximity range established for segments having accepted matches.

3. If the nominal length or duration of the new segment is an infrequently occurring commercial length, for example, nominal lengths of 20, 45, 90 or 120 seconds. Since commercials rarely have these lengths, a new segment having such a length is likely to be a chaff segment.

4. If the new segment deviates from the nominal length by an amount close to a predetermined length deviation limit adopted for determining the acceptability of the segment as a new segment of interest. For example, if the lower length deviation limit for a 30 second commercial is one second such that segments having durations less than 29 seconds are deemed not to be new segments of interest, a segment having a duration of approximately 29.1 seconds will be given on A/V capture level of 2. The more a new segment deviates from nominal length, the more likely it is a chaff segment.

On the other hand, a potential new segment is assigned a capture level 1 if it is not assigned a capture level 2.

It is appreciated that conditions 1, 3 and 4 are readily ascertained at the time a new segment of interest is found. However, ascertaining whether a new segment is proximal to a pod in accordance with condition 2 requires an assessment of subsequently received signals for matches and other new segments. Therefore, as an example, if the new segment being assessed is the first segment in a pod, it is not known immediately that the new segment is proximal to the pod. In accordance with an advantageous embodiment, new segments which satisfy all of the conditions for capture level 1 except condition 2 are initially accorded A/V capture level 1 so that the corresponding A/V data is stored in the database to permit later transmission to the control site. This determination is reviewed again after a predetermined time, for example, several minutes, at which time if the segment is still not found to be proximal to a pod, the A/V capture level of this segment is changed to capture level 2. This procedure enables the retention of the segment's A/V data pending a complete assessment of all information necessary to determine when condition 2 obtains. If this delayed assessment then established that the segment should be assigned A/V capture level 1, the A/V data thereof is still available for transmission to the central site. Otherwise, it is deleted from the database.

The use of the selective capture level technique described above allows the expert system to relax its criteria for determining which segments are likely to be segments of interest while maintaining an acceptable processing burden on the system 10 (FIG. 1). Accordingly, the expert system is thereby able to employ new segment criteria which permit the acceptance of relatively more segments as new segments of interest, for example, by adopting relatively wider length tolerances. Accordingly, any new segments of interest which would only satisfy the relaxed criteria may be detected where they would otherwise be missed. As a result, the overall system matching accuracy can be increased.

Figure 16:
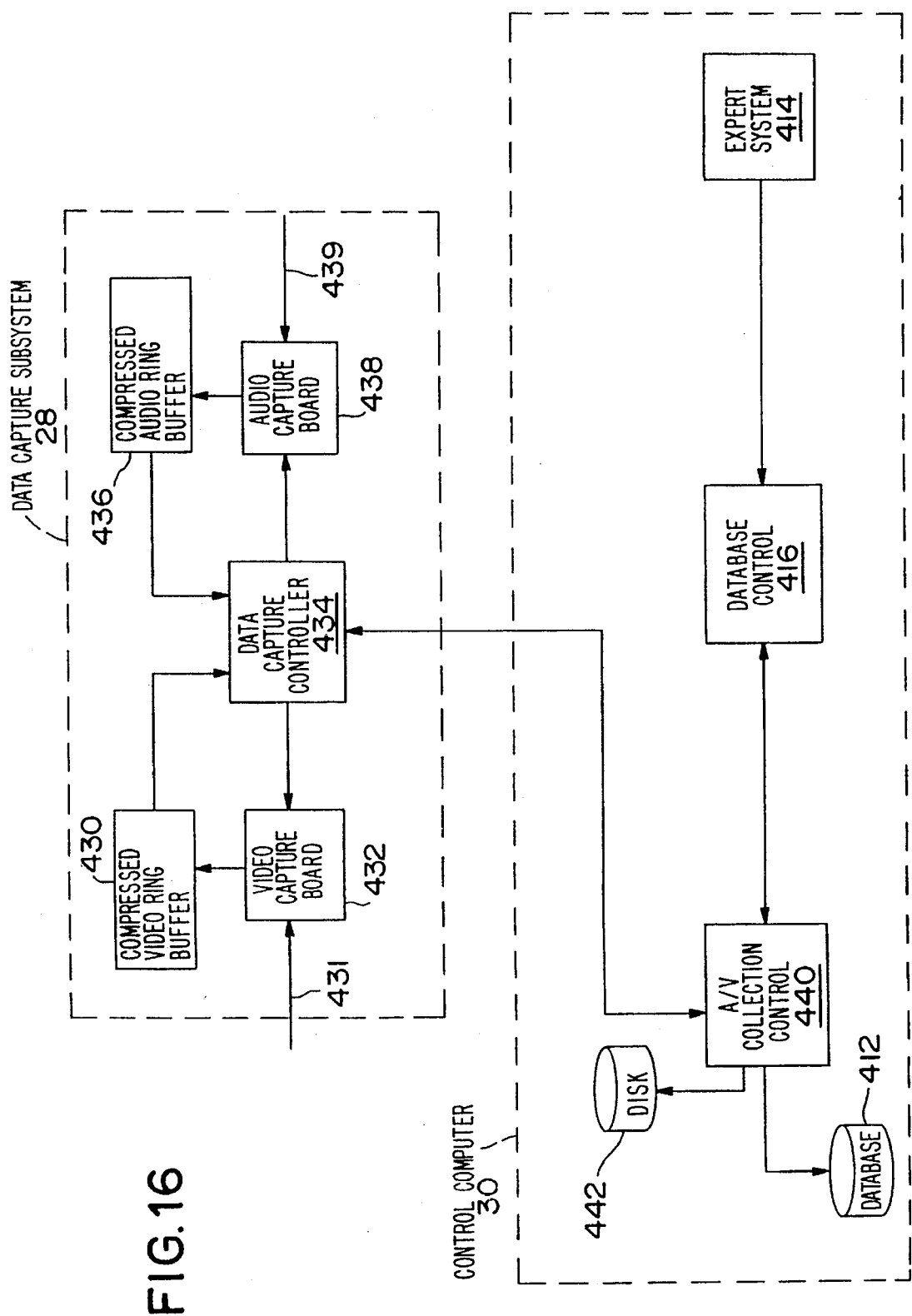
FIG. 16 is a diagram illustrating signal flows in the local site of FIG. 2 during capture of audio and video data.

FIG. 16 illustrates the signal flow for capturing audio and video data. As shown therein, baseband video and audio signals are supplied from the channel boards 402 of the segment recognition subsystem along cables 431 and 439, respectively, to the data capture subsystem 28. The data capture subsystem 28 includes a video capture board 432, a compressed video ring buffer 430, a data capture controller 434, a compressed audio ring buffer 436 and an audio capture board 438. The received baseband video signal from the cable 431 is supplied to the video capture board 432 which continuously provides newly received video signals in compressed form to the compressed video ring buffer 430 which maintains a current record of the most recently received compressed video signals, for example, those received during the last 3 to 7 minutes. Similarly, audio baseband signals from the cable 439 are supplied to the audio capture board 438 which continuously provides newly received audio signals in compressed form to the compressed audio ring buffer 436 which likewise maintains a current record thereof.

The data capture subsystem 28 communicates with the control computer 30 which, in turn, utilizes the expert system 414, the data base control 416, the data base 412, an A/V collection control 440 and a disk 442. As an example, if a new commercial has been detected which has a threshold or capture value of 1, the expert system 414 supplies a signal so indicating to the database control 416. Upon receipt of such a signal, the database control 416 supplies a command signal requesting that the respective audio and video data be transferred to the A/V collection control 440 which, in turn, supplies a corresponding request signal to the data capture controller 434. Upon receipt of such a signal, the data capture controller 434 supplies respective control signals to the video ring buffer 430 and the audio ring buffer 436, whereupon the requested video and audio signals are supplied to the data capture controller 434. The requested audio and video signals are thereafter supplied from the data capture controller 434 to the A/V collection control 440 which, in turn, supplies the same to the disk 442 for storage. Further, the A/V collection control 440 supplies the identification number of the segment along with a signal indicating whether the audio and video data have been collected for the respective segment to the data base 412. Further, in certain situations as previously described, the expert system 414 may supply a rescind signal to the database control 416. Such signal is thereafter supplied to the A/V control 440 whereupon the appropriate A/V data file is deleted. In these situations, the A/V control 440 supplies a confirmation signal to the database control 416 which confirms the deletion of such files.

KEY SIGNATURE GENERATION

Figure 17:
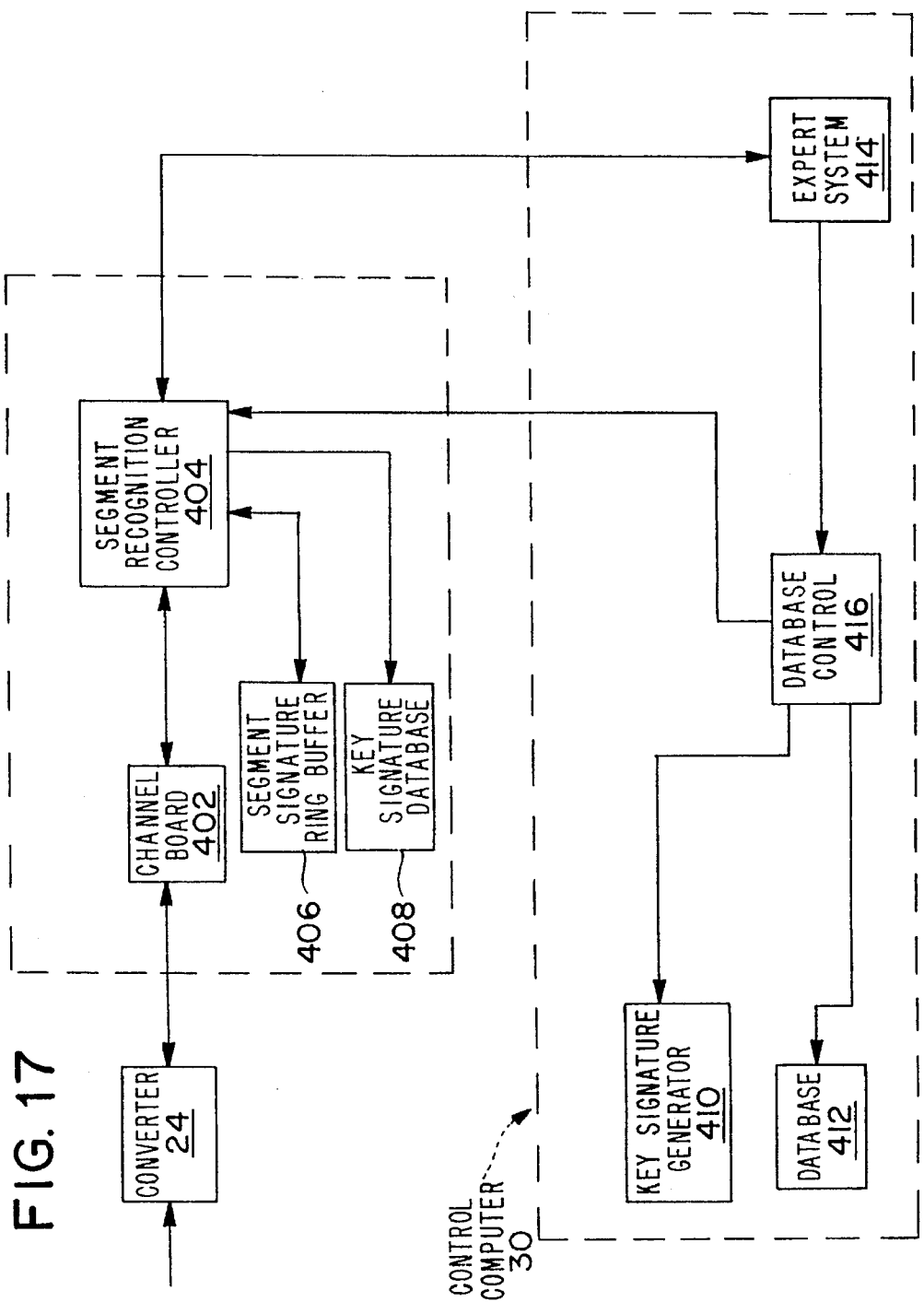
FIG. 17 is a diagram illustrating signal flows in the local site of FIG. 2 during the generation of key signatures.

Upon detection of a new segment of interest, as noted above, the system 10 produces a key signature for the segment which is later used to recognize a rebroadcast of the same segment by comparing or matching the key word and eight match words of the key signature with corresponding frame signatures of a segment signature produced for the rebroadcast segment. With reference to FIG. 17, the control computer 30 implements a key signature generator module 410 which receives sequential frame signatures for the segment of interest, referred to as a segment signature, to produce a key signature therefrom. This key signature is thereafter supplied to the segment recognition subsystem 26 for use in subsequent matching operations.

It is appreciated that a relatively large number of segments of interest (for example, commercials) will be received at each of the local sites 16 (FIG. 2) and it is desirable that each such key signature have a relatively small size to minimize the amount of memory needed. It is further desirable that the key signatures readily match upon a rebroadcast of the respective segment, while avoiding false matching. Accordingly, the key signature generator module 410 produces key signatures which are advantageously small in size and which are selected and structured to maximize the likelihood for a match on a rebroadcast of the respective segment, while reducing the potential for false matching.

A segment signature for key signature generation is received for processing by the module 410 in the form of combined audio and video frame signatures. The module 410 then separates the received segment signature into audio and video segment signatures which it processes separately. For example, the key signature generation module may perform two separate processing cycles, that is, one for the video segment signature and one for the audio segment signature. As a result, typically at least one audio key signature (or sub-signature) and one video key signature (or sub-signature) is produced for each segment signature, each having the same data format.

Each key signature preferably includes 16 elements which will now be described in detail.

1. Segment identification number (Segment ID)—this identification number uniquely identifies the segment identified by the key signature and, for example, in a television commercial recognition system may be used to more readily associate commercials with their respective key signatures. As described hereinbelow, the module 410 under certain circumstances generates up to four video key signatures and four audio key signatures for a given segment. Accordingly, the segment ID is comprised of a number divisible by five together with a number from 1 to 4 indicating the number of video or audio key signatures produced for the segment.

2. Keyword—a 16-bit keyword is selected for each segment from among the frame signatures thereof comprising its segment signature. As described above, the keywords are used by the segment recognition subsystem 26 as an index to the key signature database to minimize the time required in detecting a match.

3. Keyword offset—this represents the distance from the beginning of the respective segment to the keyword. This offset may be expressed, for example, as the number of frames from the beginning of the segment or in terms of time from the beginning of such segment.

4. Matchwords—there are a plurality of 16-bit matchwords (e.g., 8) in each key signature. The matchwords of a given key signature are used by the segment recognition subsystem 26 during the matching operation after the associated keyword has matched an incoming frame. That is, as previously described, each received frame signature is compared with all stored keywords. Upon detection of a match between an incoming frame signature and a keyword (for example, based upon a coincidence of at least fifteen corresponding bit values of the frame signature and the key word), all of the matchwords associated with this keyword are then compared to the appropriate incoming frames as determined by the matchword offsets, described below. If the total number of unmasked bits which do not match in value combined with one half the number of bits of the compared frame signatures which are masked, does not exceed a predetermined error count or threshold (described below), then a match is found. Criteria for selecting the keyword and matchwords for the key signatures are described hereinafter.

5. Matchword offset—there is a matchword offset for each of the matchwords. Each matchword offset indicates the position of the respective matchword relative to its keyword. As with the above-described keyword offsets, the matchword offsets may be expressed in terms of time differences or numbers of frames. These matchword offsets are used to indicate which of the incoming frame signatures of the broadcast segment are to be used for comparison with the matchwords in the key signature when a keyword match has been detected.

6. Signature type—the signature type identifies whether the signature is an audio sub-signature or a video subsignature. Since the audio and video key sub-signatures have the same format, this element is used to distinguish them.

7. Error count—the error count or error threshold is generated by the key signature generation module for each key signature generated and indicates the maximum number of errors which may be allowed during the matching process before the match being considered is rejected as unacceptable. The error count may be based upon specific characteristics of the generated key signature, for example, the expected dependability of the corresponding segment and the likelihood of the key signature false matching. An advantageous technique for determining the error count utilizes the probable number of bit matches for the matchwords, as described below, rounding this number down and subtracting the resulting number from the total number of possible matches. The resulting error count is made lower in the case of shorter segments which are more likely to false match. It is appreciated that, under certain conditions (e.g., due to noise), the key signature may not match perfectly to a rebroadcast of the corresponding segment. The error count compensates for such anticipated discrepancies to enable detection of the rebroadcasted segment.

8. Frame count—the frame count indicates the number of frames contained with the key signature which, in the preferred embodiment, has a value of 8.

9. Length—this refers to the number of frames in the respective segment.

10. Match rules—match rules are generated by the key signature generator module for each segment represented by one or more key signatures in the database and are guidelines utilized by the expert subsystem 414 in determining whether or not to accept a match of the key signatures for such segment. If there is a relatively high probability that both the audio and video sub-signatures will false match, the match rules require both the audio and the video key subsignatures to match in order for a match to be accepted. If, on the other hand, it is determined that neither the audio nor the video key sub-signatures are likely to false match and, in fact, may have difficulty in matching, the match rules accept a match if either the audio or the video key sub-signatures match.

The match rules are based on the probability that the sub-signatures will correctly match a rebroadcast of the corresponding segment, as well as the probabilities that the sub-signatures will false match. The manner in which the probability of a correct match is assessed is discussed hereinbelow. The probability of false matching or false match quotient is determined as the average of a first value inversely proportional to the amount of information in the signature (that is, the greater the number of bits which are the same, the higher the first value becomes) and a second value which is a normalized clumping value for the signature. The normalized clumping value is obtained by multiplying the number of key signatures in the database having the same keyword as the signature under consideration, by the a priori probability that a frame signature (or any single bit permutation thereof) corresponding with that keyword will be produced. The normalized clumping value represents the tendency of key signatures to be concentrated (or clumped) under a given keyword.

11. Number of mask bits set—this number represents the sum total of all of the mask bits which are set for the keyword and all of the associated matchwords.

12. False match quotient—this represents the likelihood of the respective key signature providing a false match when compared against a segment signature and is determined in the manner discussed above in connection with the match rules.

13. Sharpness—there are often multiple consecutive frames in a segment which are substantially identical, for example, video signal frames corresponding to a single scene. Such groups of substantially identical consecutive frames are called runs. Sharpness represents the rate of change in the bits of the frame signatures at the ends of the runs from which the key signature was derived and is used to delineate the edges of the runs.

14. Match probability of the other corresponding key sub-signature—as previously mentioned, the key signature may be divided into two sub-signatures, that is, one for audio and one for video. The match probability referred to herein is the probability that the other corresponding sub-signature will match for the respective segment. For example, consider the situation in which the segment recognition subsystem 26 detects an audio match, but not a video match, for a particular segment. This matching information is thereafter supplied to the expert system whereupon, if the audio key sub-signature has indicated therein that there is a relatively high match probability for the other sub-signature (i.e., the video sub-signature) to match, the expert system will likely not accept this as a match, since the video key sub-signature should also have matched. The match probability is determined in the course of keyword and match word selection, as described below.

15. Number of sub-signatures—this number represents the number of sub-signatures which the key signature generation module has generated for a respective segment. In certain situations, as previously mentioned, the key signature generation module may generate multiple signatures (or sub-signatures) for a particular segment if this will increase the likelihood of obtaining more acceptable matches. For example, if the first key sub-signature produced has a low false match probability as well as a low probability of a true match, the module 410 may generate further sub-signatures for the segment to increase the probability of a-true match. If so, in generating each further sub-signature the module 410 excludes frame signatures from runs previously used to generate key sub-signatures. However, if the false match probability of the first key sub-signature is comparatively high, further sub-signatures are not generated as that would increase the possibilities for a false match. In addition, if the module 410 determines that the false match probability for a video sub-signature is very high, it may choose not to generate any video sub-signatures. In a preferred embodiment, the key signature generation module may generate up to four key audio and video sub-signatures.

16. Expected peak width—typically, both keywords and matchwords are selected from the middle of frame signature runs. Accordingly, the segment recognition subsystem 26 may detect multiple matches on a given key signature for consecutive frames. The number of such consecutively detected matches is referred to as the peak width. The key signature generation module examines the run structure in the segment signature and generates an anticipated peak width value therefrom.

As previously described, each frame of an incoming segment has a frame signature associated therewith. The key signature generation module examines each of these frame signatures to select an acceptable keyword and eight matchwords for a respective key signature. In making such a selection, the key signature generator module 410 employs the following criteria:

1. Distribution of the selected frame signatures—the matchwords should be selected from among frame signatures which are evenly distributed throughout the segment signature. Such selection reduces the likelihood of false matching. For example, if two or more commercials have similar scenes, selecting matchwords from among evenly distributed frame signatures tends to cause at least several of the matchwords to be selected from frame signatures which lie outside of the similar scenes. The distribution of the matchwords is quantized as a normalized separation in time or frame intervals therebetween. However, signatures from frames near the ends of the segment should be avoided to ensure that the runs from which they are selected are contained within the respective segment, as well as to avoid utilizing signals which are more prone to variations in signal level (for example, due to the inherent delays in automatic gain control). Moreover, keywords are preferably selected from frames near the beginning of the segment, in order to maximize the available time for the expert system to evaluate a match on the corresponding key signature. Both keywords and match words should be selected from signatures at or near the centers of runs; this consideration is implemented by the match probability criterion in the manner described below.

2. The likelihood of a particular framesignature value being generated—the frame signatures generated by the segment recognition sub-system 26 may not be evenly distributed among all possible values of frame signatures, but instead may be clumped with other similar frame signatures. This corresponds with the a priori distribution of frame signatures discussed above in connection with the match rules and is determined by collecting statistically large numbers of frame signatures and determining their overall distribution to determine a normalized probability of generation for each potential frame signature. Clumping of frame signatures may cause false matching to occur and significantly increases the correlator processing load. As a result, in selecting frame signatures, the key signature generation module favors frame signatures which are not so clumped as compared to a clumped frame signature, thereby minimizing the number of key signatures having matchwords with similar values.

3. The distribution of previously established keywords— the key signature generator module 410 considers the distribution of keywords which have been previously generated and stored in a database of the segment recognition subsystem 26. As an example, for a particular keyword, the key signature generation module considers the number of generated key signatures which are associated with this keyword. If such a keyword is already associated with a large number of key signatures, such keyword is less likely to be selected as compared to a keyword associated with a lesser number of key signatures. Thus, this factor, like factor 2 above is utilized for minimizing clumping to reduce the number of false matches which occur and to reduce correlator processing load. However, unlike the above factor 2, this factor is dependent upon the broadcast signals. For example, if several commercials having similar data content are received, then several key signatures may be generated which have identical keywords. This is not due to the segment recognition subsystem 26, unlike the above factor 2, but is a function of the broadcast data and is determined as a normalized frequency of occurrence. Factors 2 and 3 are multiplied to yield a single factor indicating the undesirability of a given keyword due to clumping.

4. Run length—it has been observed that relatively short runs, for example, those having lengths less than approximately five frames, are less likely to match as compared to longer runs. Further, it has also been observed that the probability of having an acceptable match does not significantly increase for relatively long runs, for example, those having a length longer than approximately ten frames. However, such relatively long runs may produce key signatures having a relatively low entropy. Thus, it is desirable to utilize run lengths which are neither relatively short nor relatively long. In the preferred environment, the key signature generation module utilizes runs which have a length from approximately five to ten frames. Accordingly, a normalized figure of merit is assigned to each run length based on the foregoing criteria.

5. Match probability—once runs of acceptable length have been defined, the key signature generator module 410 assesses the probability of the frame signatures each successfully matching during a rebroadcast of the corresponding segment in accordance with the keyword matching process. More specifically, the keyword is selected as the frame signature at an offset n of the segment most likely to match upon rebroadcast of the segment within a predetermined guardband of $\pm g$ frame signatures. If the probability of a match with a frame signature at offset m in accordance with the keyword matching procedure (that is, a match of all 16 bits or of at least 15 of the 16 bits) is termed pk(m, n), then the probability pk(m, n) may be determined as follows:

$$pk(m, n) = 15*PM + \Sigma[PM/P(i)], i=0 \text{ to } 15$$

where PM is the probability of a match on all bits determined as follows:

PM=product [P(i)], i=0 to 15, and P(i) is the probability of a match of bits (i) of the potential key word and frame signature, where i=0 to 15. It is appreciated that P(i) is determined on the basis of the respective mask bits of the potential keyword and the frame signature being compared.

It is further appreciated that the probability that a potential keyword at offset n will match with one or more frame signatures along a given interval from an offset a to an offset b, termed pk(a:b, n) may be derived from the relationship:

pk(a:a+1, n)=pk(a, n)+pk(a+1, n)−[pk(a, n)*pk(a+1, n)].

By induction, it is seen that:

pk(a:b, n)=pk(a:b−1, n)+pk(b, n)−[pk(a:b−1, n)*pk(b, n)], which readily permits a determination of the probability that a given potential keyword at offset n will match with at least one frame signature over the interval ±g, termed pk(n−g: n+g, n). An advantageous technique for determining the guardband ±g calculates pk(n−g: n+g, n) for values of g increasing from zero until either pk(n−g, n) or pk(n+g, n) is below a predetermined threshold, which ensures that potential keywords near the centers of runs are advantageously accorded higher probabilities than those nearer the ends of the runs. By determining the respective such probabilities for all potential keywords among the acceptable runs of the segment signature, each potential keyword is assigned a figure of merit based on the matching probability determined in the foregoing manner.

Relative figures of merit are also assigned to potential match words which may be selected from the frame signatures of the acceptable runs. The figure of merit is determined in accordance with the manner in which the match words are utilized in the matching process, namely, the number of bits of each potential match word at offset n which are expected to match with the frame signatures at respective offsets m within the corresponding run are determined and then averaged over the run to derive an average number of bits expected to match over the run as the figure of merit. The number of bits expected to match between a potential match word at offset n and a frame signature at offset m, termed bm(m, n), is determined as follows:

bm(m, n)=Σ[P(i)], i=0 to 15 where P(i) is the probability of a match of bits (i), obtained in the same manner as in the case of the keyword matching probability determination. Then the average of the number of bits expected to match, bm(m, n), is determined over a run length from offset a to offset b as follows:

bm(a: b, n)=Σ[bm(m,n)]/(b−a+1), m=a to b.

The boundaries a and b of the run are determined in the same fashion as in the keyword matching probability determination.

6. Entropy—the key signature generation module prefers matchwords from the segment signature which have a relatively high entropy, that is, matchwords each having a respective data content which is dissimilar from that of the other selected matchwords. The selection of high entropy matchwords minimizes the correlation between matchwords and, consequently reduces the likelihood false matching. A normalized dissimilarity in data content among matchwords may be determined by counting the number of bits which are different between the matchwords.

7. Run sharpness—the key signature generation module preferably selects a keyword and the eight matchwords from within frame runs which are bounded by frame signatures having signature values which are substantially different than those of adjacent frames within the run. The difference in bit values between the boundary frame signature and adjacent signatures within the run is used to derive a normalized figure of merit for run sharpness.

It is appreciated that it may not always be possible to optimize each of the above seven factors when selecting a keyword and/or matchwords. Accordingly, for each keyword and/or matchword being considered, the key signature generation module assigns a normalized merit value for each of the above-described seven factors as described above. For keyword selection, respective keyword weighting factors are obtained from a parameter file and are multiplied with corresponding normalized merit values. The products are then summed to yield on overall merit value for each possible keyword. For matchword selection, the same process of weighting and combining the normalized factors of merit is employed, utilizing different respective weighting factors from the parameter file.

The parameter files are derived empirically. In accordance with one technique for doing so, all weighting factors are initially set to the same value and key signatures are then generated to evaluate the relative importance of each criterion in key signature generation. This process is repeated until by accumulation and evaluation of the results, the most advantageous weighting factors are ascertained. Different parameter files are maintained for video and audio signatures in recognition of their differing characteristics. The parameter files also include maximum allowable values for error thresholds as a function of segment length, as it has been observed that relatively short segments, for example, those shorter than approximately 10 seconds, are more likely to false match than relatively longer segments, for example, those of 30 seconds or more.

Figure 18:
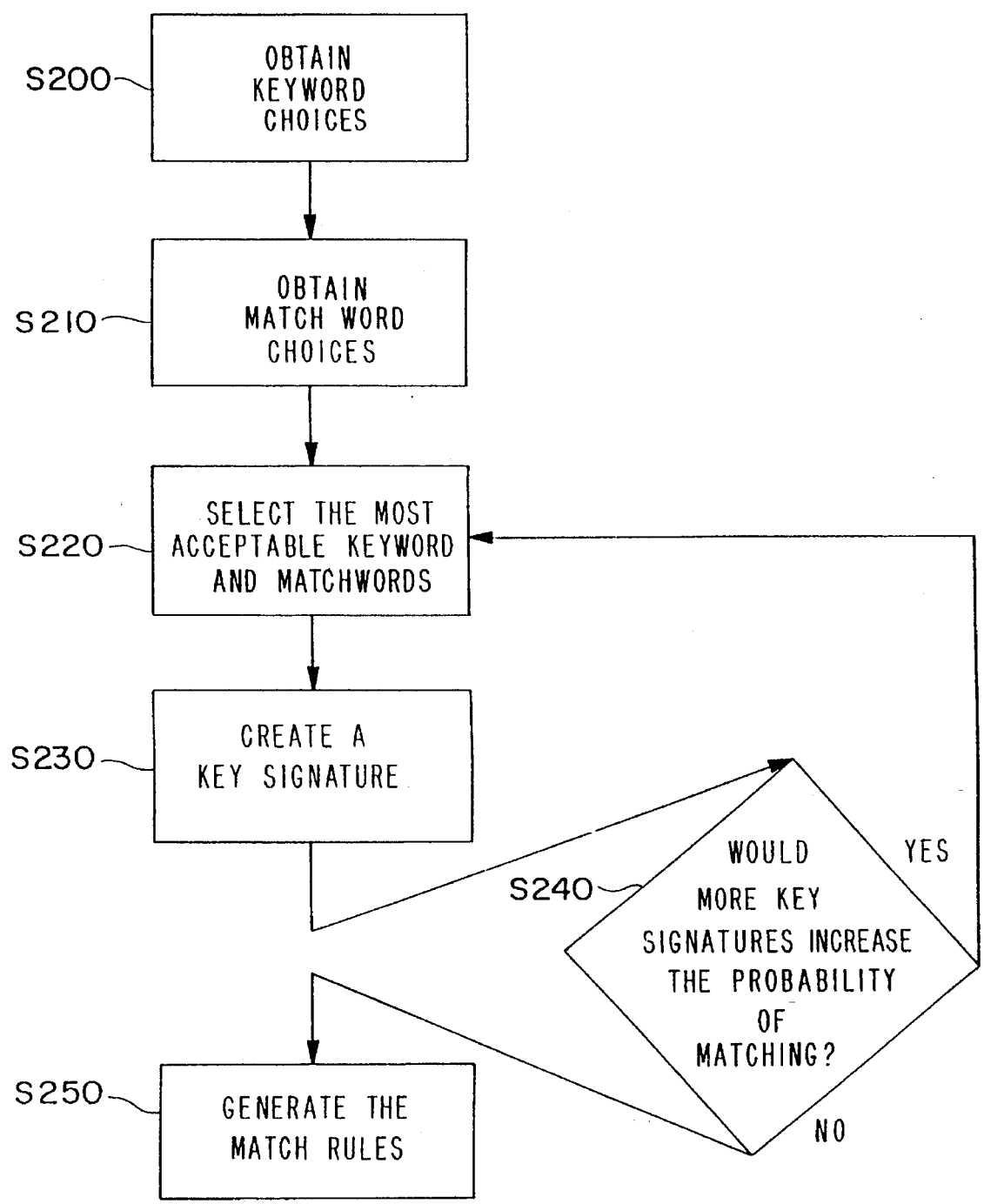
FIG. 18 is a flow chart illustrating steps performed in generating key signatures.

The basic steps utilized by the key signature generation module are illustrated in FIGS. 18. As shown therein, frame signatures from defined runs which are under consideration for use as keywords and matchwords are obtained as shown in steps S200 and S210, respectively. Thereafter, in S220, the most acceptable keyword and matchWords are selected by comparing the total merit values for each keyword and matchword candidate, as described above together with absolute criteria such as observance of maximum allowable error thresholds. From the selected keyword and matchwords, a corresponding key signature is created as indicated in step S230. Thereafter, in step S240, a determination is made whether more key signatures should be produced to increase the probability of matching. If the determination at step S240 is affirmative, additional key signatures are produced by repeating steps S200–S230, utilizing different runs, however. If, on the other hand, additional key signatures are not required, as indicated by a NO at step S240, then the match rules for the key signature generated in step S230 are formulated and combined with the key signature, as indicated in step S250.

Referring again to FIG. 17, typical signal data flows in the generation of a key signature are illustrated therein. The signal data flow is primarily between the segment recognition subsystem 26 and the control computer 30. More specifically, a desired broadcast signal is received by a respective one of the converters 24, which is tuned to the desired channel. Baseband video and audio signals are supplied from the tuner 24 to the corresponding one of the channel boards 402 of the segment recognition subsystem 26 which is adapted to generate frame signatures and corresponding mask words for each frame of the received baseband signals. These frame signatures and mask words are supplied to the segment recognition controller 404 of the segment recognition subsystem 26.

Before it can be determined that a new segment of interest has been received so that a key signature must be produced, the segment recognition controller 404 attempts to match the received frame signatures with existing key signatures, as previously described. The segment recognition controller 404 supplies cues (including match reports) to the expert system module 414 contained within the control computer 30 which the expert system uses to detect new segments of interest. Thereafter, the expert system 414 supplies a request signal to the segment recognition controller 404 for the segment signature of the segment which did not match and which may be a new segment of interest. In response thereto, the segment recognition controller 404 retrieves the respective segment signature from a segment signature ring buffer 406 and supplies the same to the expert system module. If the expert system 414 determines that the respective segment is a segment of interest, the expert system supplies a signal, which includes all necessary information pertaining thereto (e.g., the segment signature, an identification number, the channel and the time of day), through the database control module 416 to the key signature generator 410 implemented by the control computer 30. The key signature generator 410 generates a new key signature for the received segment in a manner as previously described and supplies the new key signature through the database control module 416 to the segment recognition controller 404 which, in turn, supplies the same to a key signature database 408. Further, information regarding the new segment of interest is supplied from the database control module 416 to the database 412.

The term "probability" as used throughout this specification refers both to the relative likelihood or frequency of occurrence of an event or events as well as the absolute likelihood of an event or events occurring, and may be expressed either as a normalized value or otherwise, for example, as an unquantified expression of the relative likelihood of two or more events. The term "broadcast" as used herein refers to various modes for the wide dissemination of information, such as radio and television broadcasts, whether distributed over-the-air, by cable, CATV, satellite or otherwise, as well as other modes for the wide dissemination of data and information.

It is appreciated that, while video frame or field intervals are utilized in the disclosed embodiment for the generation of signatures as well as for other purposes in connection with a television commercial recognition system, the use of frame or field intervals is employed merely for convenience, and it is understood that different intervals may be selected for signature generation and such other purposes. As an example, signatures may be produced from a combination of fields or frames or from subsets of frame or field information in video signals, and that audio intervals need not correspond with video intervals, but may be arbitrarily chosen. In accordance with a system for recognizing radio broadcast segments, any arbitrary interval may be utilized for signature generation and other purposes, provided that sufficient information is included in the selected interval.

While an embodiment of the present invention has been disclosed for recognizing television broadcast commercials, it will be understood that the systems and methods for continuous pattern recognition of broadcast segments in accordance with the present invention may be utilized for other purposes, such as determining what programs, songs or other works have been broadcast, for example, for determining royalty payments, or else for determining the programs, commercials or other segments which have been received by audience members participating in an audience measurement survey.

It will be appreciated that the systems and methods of the present invention may be implemented in whole or in part using either analog or digital circuitry, or both, and that the elements and steps thereof may be implemented or carried out utilizing any of a variety of system and subsystem configurations and devices, and that the various steps and elements may be carried out and implemented either with the use of hardwired or software based processors.

Although specific embodiments of the invention have been described in detail herein with reference to the accompanying drawings, it is understood that the invention is not limited to those precise embodiments, and that various changes and modifications may be effected therein by one skilled in the art without departing from the scope or spirit of the invention as defined in the appended claims.

We claim:

1. A method of producing a signature characterizing an audio broadcast signal for use in broadcast signal recognition, comprising the steps of:

forming a plurality of frequency band values each representing portions of said audio broadcast signal within a respective predetermined frequency band;

comparing each of a first group of said plurality of frequency band values with a respective one of a second group of said plurality of frequency band values representing portions of said audio broadcast signal within the same respective predetermined frequency band, each respective one of the second group of said plurality of frequency band values representing portions of said audio broadcast signal at least a part of which were broadcast prior to the portions of said audio broadcast signal represented by the corresponding one of said first group of said plurality of frequency band values; and forming said signature based upon the comparisons of the first and second groups of said plurality of frequency band values.

2. The method of claim 1, wherein the step of forming a plurality of frequency band values comprises forming first frequency band signals each representing a characteristic of said audio broadcast signal within a respective predetermined frequency band, and transforming each of said first frequency band signals to a corresponding one of said plurality of frequency band values based upon at least one other first frequency band signal.

3. The method of claim 2, wherein the step of forming said first frequency band signals comprises forming a plurality of power level signals each representing a power level of said audio broadcast signal within a respective predetermined frequency band, and the step of transforming said first frequency band signals comprises dividing each of said plurality of power level signals by a linear combination of others of said first frequency band signals.

4. A system for producing a signature characterizing an audio broadcast signal for use in broadcast signal recognition, comprising:

means for forming a plurality of frequency band values each representing portions of said audio broadcast signal within a respective predetermined frequency band;

means for comparing each of a first group of said plurality of frequency band values with a respective one of a second group of said plurality of frequency band values representing portions of said audio broadcast signal within the same respective predetermined frequency band, each respective one of the second group of said plurality of frequency band values representing portions of said audio broadcast signal at least a part of which was broadcast prior to the portions of said audio broadcast signal represented by the corresponding one of said first group of said plurality of frequency band values; and means for forming said signature based upon the comparisons of the first and second groups of said plurality of frequency band values.

* * * * *